US012028808B2

(12) United States Patent
Balasubramanian et al.

(10) Patent No.: US 12,028,808 B2
(45) Date of Patent: Jul. 2, 2024

(54) SIDELINK-INDUCED UU WAKE-UP SIGNAL

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US); Sony Akkarakaran, Poway, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 302 days.

(21) Appl. No.: 17/501,853

(22) Filed: Oct. 14, 2021

(65) Prior Publication Data

US 2023/0117480 A1 Apr. 20, 2023

(51) Int. Cl.
*H04W 52/02* (2009.01)
*H04L 1/00* (2006.01)
*H04W 72/21* (2023.01)
*H04W 92/18* (2009.01)

(52) U.S. Cl.
CPC ....... *H04W 52/0229* (2013.01); *H04L 1/0025* (2013.01); *H04W 72/21* (2023.01); *H04W 92/18* (2013.01)

(58) Field of Classification Search
CPC . H04W 52/0229; H04W 72/21; H04W 92/18; H04L 1/0025

USPC ......................................................... 370/318
See application file for complete search history.

(56) References Cited

U.S. PATENT DOCUMENTS

| | | | | |
|---|---|---|---|---|
| 2010/0167743 | A1* | 7/2010 | Palanki | H04B 7/155 455/67.11 |
| 2019/0166640 | A1* | 5/2019 | Wei | H04W 72/52 |
| 2021/0377842 | A1* | 12/2021 | Xu | H04W 76/14 |

* cited by examiner

*Primary Examiner* — Chi Tang P Cheng
(74) *Attorney, Agent, or Firm* — Holland & Hart LLP

(57) ABSTRACT

Methods, systems, and devices for wireless communications are described. For example, a base station may receive, from a first user equipment (UE), an uplink message that includes one or more sidelink communication identifications each associated with a different UE of a set of one or more UEs and may associate each of the one or more sidelink communication identifications with a corresponding second identification also associated with each of the set of one or more UEs. The base station may transmit one or more signals for transitioning each of the set of one or more UEs associated with the set of second identifications from an inactive mode to an active mode based on associating each of the set of one or more sidelink communication identifications with the second identification of the set of second identifications. A second UE may receive, while in the inactive mode from the base station, the one or more signals that trigger the transition and may communicate with the first UE based on receiving the wake-up signal.

20 Claims, 20 Drawing Sheets

SIDELINK-INDUCED UU WAKE-UP SIGNAL

FIELD OF TECHNOLOGY

The following relates to wireless communications, including sidelink-induced Uu wake-up signal (WUS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, the UEs of the wireless multiple-access communications system may be configured with one or more mechanisms for coordinated communications with a base station. For example, a first UE may enter an inactive mode according to a discontinuous communication cycle and may enter an active mode according to the cycle to receive downlink communications from a base station. In some examples, the base station may determine to communicate with the first UE when in the inactive mode and may transmit a wake-up signal (WUS) to the first UE.

SUMMARY

The described techniques relate to improved methods, systems, devices, and apparatuses that support sidelink-induced Uu wake-up signal (WUS). Generally, the described techniques provide for mechanisms for communications with a UE during a sleep duration (OFF duration, inactive duration) of a discontinuous communication cycle, such as a discontinuous reception (DRX) cycle. For example, a base station may transmit a WUS to a UE which may prompt the UE to enter an active mode (e.g., wake mode) for an active duration and receive communications from another UE as a result of being awakened.

In some examples, the UEs of the wireless multiple-access communications system may be configured for sidelink communications. For example, a first UE may determine to perform sidelink communications with a second UE while the second UE is in the inactive mode. A base station may be configured to transmit a WUS in such situations. The first UE may transmit an uplink message including a sidelink ID of the second UE to the base station. The first UE may have received the sidelink ID of the second UE in a previous sidelink communication with the second UE. The base station may receive the sidelink ID of the second UE and may associate the sidelink ID with a Uu ID of the second UE. The base station may transmit a WUS to the second UE which may prompt the second UE to enter an active mode for communications with the first UE, the base station, or both.

A method for wireless communication at a base station is described. The method may include receiving, from a first user equipment (UE), an uplink message that includes a set of one or more sidelink communication identifications each associated with a different UE of a set of one or more UEs, associating each of the set of one or more sidelink communication identifications with a corresponding second identification of a set of second identifications, each of the set of second identifications also associated with each of the set of one or more UEs, and transmitting one or more signals for transitioning each of the set of one or more UEs associated with the set of second identifications from an inactive mode to an active mode based on associating each of the set of one or more sidelink communication identifications with the second identification of the set of second identifications.

An apparatus for wireless communication at a base station is described. The apparatus may include a processor, memory coupled with the processor, and instructions stored in the memory. The instructions may be executable by the processor to cause the apparatus to receive, from a first UE, an uplink message that includes a set of one or more sidelink communication identifications each associated with a different UE of a set of one or more UEs, associate, based on receiving the uplink message from the first UE, each of the set of one or more sidelink communication identifications with a corresponding second identification of a set of second identifications, each of the set of second identifications also associated with each of the set of one or more UEs, and transmit one or more signals for transitioning each of the set of one or more UEs associated with the set of second identifications from an inactive mode to an active mode based on associating each of the set of one or more sidelink communication identifications with the second identification of the set of second identifications.

Another apparatus for wireless communication at a base station is described. The apparatus may include means for receiving, from a first UE, an uplink message that includes a set of one or more sidelink communication identifications each associated with a different UE of a set of one or more UEs, means for associating each of the set of one or more sidelink communication identifications with a corresponding second identification of a set of second identifications, each of the set of second identifications also associated with each of the set of one or more UEs, and means for transmitting one or more signals for transitioning each of the set of one or more UEs associated with the set of second identifications from an inactive mode to an active mode based on associating each of the set of one or more sidelink communication identifications with the second identification of the set of second identifications.

A non-transitory computer-readable medium storing code for wireless communication at a base station is described. The code may include instructions executable by a processor to receive, from a first UE, an uplink message that includes a set of one or more sidelink communication identifications each associated with a different UE of a set of one or more UEs, associate, based on receiving the uplink message from the first UE, each of the set of one or more sidelink communication identifications with a corresponding second identification of a set of second identifications, each of the set of second identifications also associated with each of the set of one or more UEs, and transmit one or more signals for transitioning each of the set of one or more UEs associated with the set of second identifications from an inactive mode to an active mode based on associating each of the set of one or more sidelink communication identifications with the second identification of the set of second identifications.

In some examples of the method, apparatuses, and non-transitory computer-readable medium described herein, transmitting the one or more signals may include operations, features, means, or instructions for transmitting the one or more signals using a first set of resources that may be different from a second set of resources used to transmit a wake-up signal for transitioning each of the set of one or more UEs from the inactive mode to the active mode for base station-UE communications.

In some examples of the method, apparatuses, and non-transitory computer-readable medium described herein, transmitting the one or more signals may include operations, features, means, or instructions for transmitting the one or more signals using a first sequence that may be different from a second sequence used to transmit a wake-up signal for transitioning each of the set of one or more UEs from the inactive mode to the active mode for base station-UE communications.

In some examples of the method, apparatuses, and non-transitory computer-readable medium described herein, transmitting the one or more signals may include operations, features, means, or instructions for transmitting the one or more signals using a sequence that may be indicative of a wake-up signal for transitioning each of the set of one or more UEs from the inactive mode to the active mode for both the sidelink communications and base station-UE communications.

Some examples of the method, apparatuses, and non-transitory computer-readable medium described herein may further include operations, features, means, or instructions for transmitting radio resource control signaling in order to configure the set of one or more UEs with resources or sequences to be used in the transmitting of the one or more signals, where the resources or sequences may be different from wake-up resources or sequences used for base station-UE communications.

In some examples of the method, apparatuses, and non-transitory computer-readable medium described herein, transmitting the one or more signals may include operations, features, means, or instructions for transmitting the one or more signals as wake-up signals that include first payloads that indicate that the wake-up signals may be for transitioning each of the set of one or more UEs from the inactive mode to the active mode for the sidelink communications during a first duration of time, where the first payloads may be different from second payloads that indicate that the wake-up signals may be for transitioning each of the set of one or more UEs for base station-UE communications or for both the sidelink communications and the base station-UE communications during a second duration of time.

In some examples of the method, apparatuses, and non-transitory computer-readable medium described herein, transmitting the one or more signals may include operations, features, means, or instructions for transmitting the one or more signals as wake-up signals that include an indication of a first pool of resources for the set of one or more UEs to monitor for sidelink communications after transitioning from the inactive mode to the active mode, where the first pool of resources may be different from a second pool of resources configured for base station-UE communications.

In some examples of the method, apparatuses, and non-transitory computer-readable medium described herein, transmitting the one or more signals may include operations, features, means, or instructions for transmitting a group wake-up signal to each of the set of one or more UEs.

Some examples of the method, apparatuses, and non-transitory computer-readable medium described herein may further include operations, features, means, or instructions for determining that at least one UE of the set of one or more UEs may be connected to a second base station and transmitting, to the second base station, a message that includes a sidelink communication identification of the at least one UE to trigger the second base station to transmit a wake-up signal to the at least one UE.

In some examples of the method, apparatuses, and non-transitory computer-readable medium described herein, the message may be transmitted via an X2 interface.

In some examples of the method, apparatuses, and non-transitory computer-readable medium described herein, receiving the uplink message may include operations, features, means, or instructions for receiving either a scheduling request or a buffer status report as the uplink message.

In some examples of the method, apparatuses, and non-transitory computer-readable medium described herein, the one or more sidelink communication identifications include layer 1 identifiers, layer 2 identifiers, or layer 3 identifiers and the set of second identifications includes a set of Uu interface identifiers.

In some examples of the method, apparatuses, and non-transitory computer-readable medium described herein, the set of Uu interface identifiers includes a set of cell radio network temporary identifiers.

A method for wireless communication at a first UE is described. The method may include receiving, from a second UE that is in an active mode, a sidelink message that includes an identification of the second UE, determining, subsequent to receiving the identification of the second UE, to further communicate via sidelink communications with the second UE while the second UE is in an idle mode, transmitting an uplink message to a base station to trigger the base station to send a wake-up signal to the second UE, the uplink message including the identification of the second UE, and communicating with the second UE once the second UE has re-entered the active mode subsequent to transmission of the uplink message.

An apparatus for wireless communication at a first UE is described. The apparatus may include a processor, memory coupled with the processor, and instructions stored in the memory. The instructions may be executable by the processor to cause the apparatus to receive, from a second UE that is in an active mode, a sidelink message that includes an identification of the second UE, determine, subsequent to receiving the identification of the second UE, to further communicate via sidelink communications with the second UE while the second UE is in an idle mode, transmit an uplink message to a base station to trigger the base station to send a wake-up signal to the second UE, the uplink message including the identification of the second UE, and communicate with the second UE once the second UE has re-entered the active mode subsequent to transmission of the uplink message.

Another apparatus for wireless communication at a first UE is described. The apparatus may include means for receiving, from a second UE that is in an active mode, a sidelink message that includes an identification of the second UE, means for determining, subsequent to receiving the identification of the second UE, to further communicate via sidelink communications with the second UE while the second UE is in an idle mode, means for transmitting an uplink message to a base station to trigger the base station to send a wake-up signal to the second UE, the uplink message including the identification of the second UE, and means for communicating with the second UE once the second UE has re-entered the active mode subsequent to transmission of the uplink message.

A non-transitory computer-readable medium storing code for wireless communication at a first UE is described. The code may include instructions executable by a processor to receive, from a second UE that is in an active mode, a sidelink message that includes an identification of the second UE, determine, subsequent to receiving the identification of the second UE, to further communicate via sidelink communications with the second UE while the second UE is in an idle mode, transmit an uplink message to a base station to trigger the base station to send a wake-up signal to the second UE, the uplink message including the identification of the second UE, and communicate with the second UE once the second UE has re-entered the active mode subsequent to transmission of the uplink message.

In some examples of the method, apparatuses, and non-transitory computer-readable medium described herein, transmitting the uplink message may include operations, features, means, or instructions for transmitting, in the uplink message, multiple identifications of multiple UEs with which the first UE may be to communicate via sidelink communications, the second UE being one of the multiple UEs.

In some examples of the method, apparatuses, and non-transitory computer-readable medium described herein, transmitting the uplink message may include operations, features, means, or instructions for transmitting a scheduling request or a buffer status report as the uplink message.

In some examples of the method, apparatuses, and non-transitory computer-readable medium described herein, receiving the sidelink message may include operations, features, means, or instructions for receiving an indication of a discontinuous reception cycle associated with communications at the second UE.

In some examples of the method, apparatuses, and non-transitory computer-readable medium described herein, the sidelink communications include groupcast or unicast communications.

In some examples of the method, apparatuses, and non-transitory computer-readable medium described herein, the identification of the second UE may be one of a layer 1 identifier, a layer 2 identifier, a layer 3 identifier.

A method for wireless communication at a second UE is described. The method may include transmitting, while in an active mode to a first UE, a sidelink message that includes an identification of the second UE, receiving, while in an inactive mode from a base station, a wake-up signal for triggering a transition from the inactive mode to the active mode based on transmitting the sidelink message, and communicating with the first UE once the second UE has re-entered the active mode based on receiving the wake-up signal while in the inactive mode.

An apparatus for wireless communication at a second UE is described. The apparatus may include a processor, memory coupled with the processor, and instructions stored in the memory. The instructions may be executable by the processor to cause the apparatus to transmit, while in an active mode to a first UE, a sidelink message that includes an identification of the second UE, receive, while in an inactive mode from a base station, a wake-up signal for triggering a transition from the inactive mode to the active mode based on transmitting the sidelink message, and communicate with the first UE once the second UE has re-entered the active mode based on receiving the wake-up signal while in the inactive mode.

Another apparatus for wireless communication at a second UE is described. The apparatus may include means for transmitting, while in an active mode to a first UE, a sidelink message that includes an identification of the second UE, means for receiving, while in an inactive mode from a base station, a wake-up signal for triggering a transition from the inactive mode to the active mode based on transmitting the sidelink message, and means for communicating with the first UE once the second UE has re-entered the active mode based on receiving the wake-up signal while in the inactive mode.

A non-transitory computer-readable medium storing code for wireless communication at a second UE is described. The code may include instructions executable by a processor to transmit, while in an active mode to a first UE, a sidelink message that includes an identification of the second UE, receive, while in an inactive mode from a base station, a wake-up signal for triggering a transition from the inactive mode to the active mode based on transmitting the sidelink message, and communicate with the first UE once the second UE has re-entered the active mode based on receiving the wake-up signal while in the inactive mode.

In some examples of the method, apparatuses, and non-transitory computer-readable medium described herein, receiving the wake-up signal triggering the transition from the inactive mode to the active mode may include operations, features, means, or instructions for receiving the wake-up signal in a first resource that may be different from a second resource configured for receiving second wake-up signals for triggering the transition from the inactive mode to the active mode for base station-UE communications.

In some examples of the method, apparatuses, and non-transitory computer-readable medium described herein, receiving the wake-up signal triggering the transition from the inactive mode to the active mode may include operations, features, means, or instructions for receiving the wake-up signal as a first sequence of a set of preconfigured sequences, where the first sequence may be different from a second sequence of the set of preconfigured sequences, the first sequence triggering the transition from the inactive mode to the active mode for the sidelink communications, and the second sequence triggering the transition from the inactive mode to the active mode for base station-UE communications.

Some examples of the method, apparatuses, and non-transitory computer-readable medium described herein may further include operations, features, means, or instructions for identifying a selected active mode on duration during which the second UE may be to remain in the active mode, where the selected active mode on duration may be a longer of a first active mode on duration associated with a discontinuous reception cycle for base station-UE communications and a second active mode on duration associated with the sidelink communications and remaining in the active mode in accordance with the selected active mode on duration.

Some examples of the method, apparatuses, and non-transitory computer-readable medium described herein may further include operations, features, means, or instructions for switching a transceiver mode based on receiving the wake-up signal, where the transceiver mode includes at least a sidelink communications mode.

Some examples of the method, apparatuses, and non-transitory computer-readable medium described herein may further include operations, features, means, or instructions for activating a transceiver chain based on receiving the wake-up signal and maintaining the transceiver chain in an on state for a duration of the sidelink communication.

In some examples of the method, apparatuses, and non-transitory computer-readable medium described herein, the identification of the second UE may be a layer 1 identifier, a layer 2 identifier, or a layer 3 identifier.

DETAILED DESCRIPTION

Figure 1:
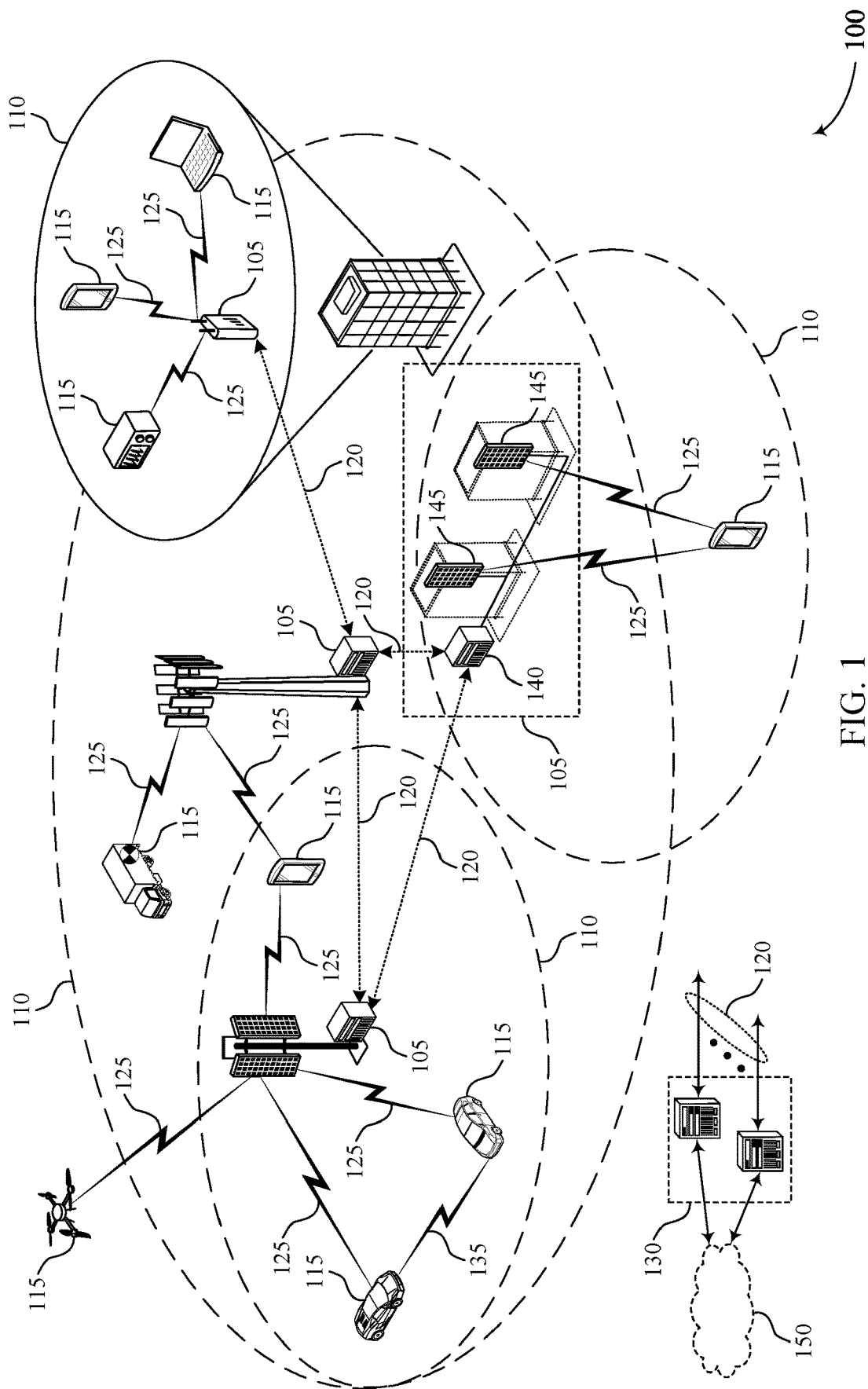
FIG. 1 illustrates an example of a wireless communications system that supports sidelink-induced Uu wake-up signal (WUS) in accordance with aspects of the present disclosure.

A wireless multiple-access communications system may include one or more base stations or one or more network access nodes, each simultaneously supporting communication for multiple communication devices, which may be otherwise known as user equipment (UE). In the wireless communications system, wireless communications between a UE and a base station may occur over a communication link, such as an access link (also referred to as a Uu interface). The wireless communications system may additionally, or alternatively, support sidelink communications between multiple communication devices. Examples of sidelink communications may include, but are not limited to, device-to-device (D2D) communications, vehicle-based communications, which may also be referred to as vehicle-to-everything (V2X) communications systems, vehicle-to-vehicle (V2V) communications systems, or cellular V2X (C-V2X) communications systems. Sidelink communications between UEs may occur over a communication link, such as a sidelink.

A UE may operate according to a power saving mode (also referred to as a discontinuous reception (DRX) mode) to preserve power by operating in an active state or an inactive state (also referred to as a sleep state) according to the DRX mode. In the active state, the UE may monitor a channel (e.g., a sidelink channel, an access link channel), transmit wireless communications (e.g., sidelink communication, access link communications), or receive wireless communications, among other examples, during an active duration (also referred to as an ON duration). In the inactive state (e.g., inactive mode, sleep mode), the UE may conserve power rather than monitoring the channel, transmitting the wireless communication, or receiving the wireless communication, among other examples, during an inactive duration (also referred to as an OFF duration).

The UE power saving mode (e.g., a DRX mode) may allow the UE to save battery power by sleeping during an inactive duration (also referred to as an OFF duration or a sleep duration) and waking up during an active duration (e.g., active mode). In some examples, a base station may determine to communicate with the UE in the inactive duration of the UE (e.g., while the UE is operating in the inactive mode).

In such examples, the base station may transmit a wake-up signal (WUS) (which may include a wake-up indicator) to the UE to prompt the UE to enter the active mode for receiving signaling (e.g., physical downlink control channel (PDCCH), physical downlink shared channel (PDSCH)) from the base station. For example, the UE may decode the WUS and may further receive and decode PDCCH transmitted by the base station based on receiving the WUS. The UE may remain in the active mode for a period of time after receiving the WUS, where the period of time may restart based on receiving a second (or a third, a fourth, etc.) PDCCH.

In some examples, another UE may determine to communicate with the first UE while the first UE is in the inactive duration. Based on previous communications with the first UE during the active duration of the first UE, the second UE may have received a sidelink ID of the first UE. The second UE may transmit an uplink message including the sidelink ID of the first UE to the base station to trigger the base station to send a WUS to the first UE. The base station may receive the message including the sidelink ID of the first UE and may associate the sidelink ID of the first UE with an access link (e.g., Uu interface) ID of the first UE based on a configuration of the base station. For example, the base station may be configured with a mapping of sidelink IDs to Uu IDs or may be preconfigured with a set of sidelink IDs and Uu IDs among other examples. The base station may transmit the WUS to the first UE for transitioning the first UE from the inactive mode to the active mode based on receiving the uplink message from the second UE.

The first UE may receive, while in the inactive mode from the base station, the WUS for triggering a transition from the inactive mode to the active mode and may communicate with the second UE, the base station, or both, once the first UE has re-entered the active mode based on receiving the WUS while in the inactive mode. As such, the sidelink-induced WUS may provide mechanisms for the second UE to communicate with the first UE while in an inactive duration of the power saving mode.

Aspects of the disclosure are initially described in the context of wireless communications systems. Aspects of the disclosure are then described in the context of a WUS timing configuration and a process flow. Aspects of the disclosure are further illustrated by and described with reference to apparatus diagrams, system diagrams, and flowcharts that relate to sidelink-induced Uu WUS.

FIG. 1 illustrates an example of a wireless communications system 100 that supports sidelink-induced Uu WUS in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode (e.g., inactive mode) when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over sidelink communication link 135 (e.g., a device-to-device (D2D) communication link, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the sidelink communication link 135 (e.g., D2D communication link) may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may include a number of UEs 115 that are configured with a cyclic schedule (e.g., a DRX cycle) for conserving power at the UE 115. For example, the cyclic schedule may specify periods when the UE 115 is to enter an inactive mode in which the UE 115 is configured to refrain from receiving (e.g., decoding) communications from other entities and may specify periods for the UE 115 to operate in the active mode in which the UE is configured to receive (e.g., decode) communications from other entities. In some examples, however, an entity, such as base station 105, may determine to communicate with the UE 115 while the UE 115 is in the inactive mode according to the cyclic schedule.

In such examples, the base station 105 may transmit a WUS (which may include a wake-up indicator) to the UE 115 to prompt the UE 115 to enter the active mode for receiving signaling (e.g., PDCCH, PDSCH) from the base station 105. For example, the UE 115 may decode the wake-up indicator and may further receive and decode PDCCH transmitted by the base station 105 based on receiving the WUS. The UE 115 may remain in the active mode for a period of time after receiving the WUS, where the period of time may restart based on receiving a second (a third, a fourth, etc.) PDCCH.

In some examples, the UEs 115 may additionally be configured for sidelink communications while operating according to the cyclic schedule. For example, a first UE 115 may determine to communicate with a second UE 115 that is in the inactive mode. Based on previous communications with the second UE 115 in the active mode, the first UE 115 may have received a sidelink ID of the second UE 115. The first UE 115 may transmit an uplink message including the sidelink ID of the second UE 115 to the base station 105 to trigger the base station 105 to send a WUS to the second UE. The base station 105 may receive the message including the sidelink ID of the second UE 115 and may associate the sidelink ID of the second UE 115 with a Uu ID of the second UE 115 based on a configuration of the base station 105. For example, the base station 105 may be configured with a mapping of sidelink IDs to Uu IDs or may be preconfigured with a set of sidelink IDs and Uu IDs among other examples. The base station 105 may transmit a WUS to the second UE 115 for transitioning the second UE 115 from the inactive mode to the active mode based on receiving the uplink message from the first UE 115.

The second UE may receive, while in the inactive mode from the base station 105, the WUS for triggering a transition from the inactive mode to the active mode and communicate with the first UE 115 once the second UE 115 has re-entered the active mode based on receiving the WUS while in the inactive mode. As such, the sidelink-induced WUS may provide mechanisms for the first UE 115 to communicate with the second UE 115 that is operating according to the cyclic schedule.

Figure 2A:
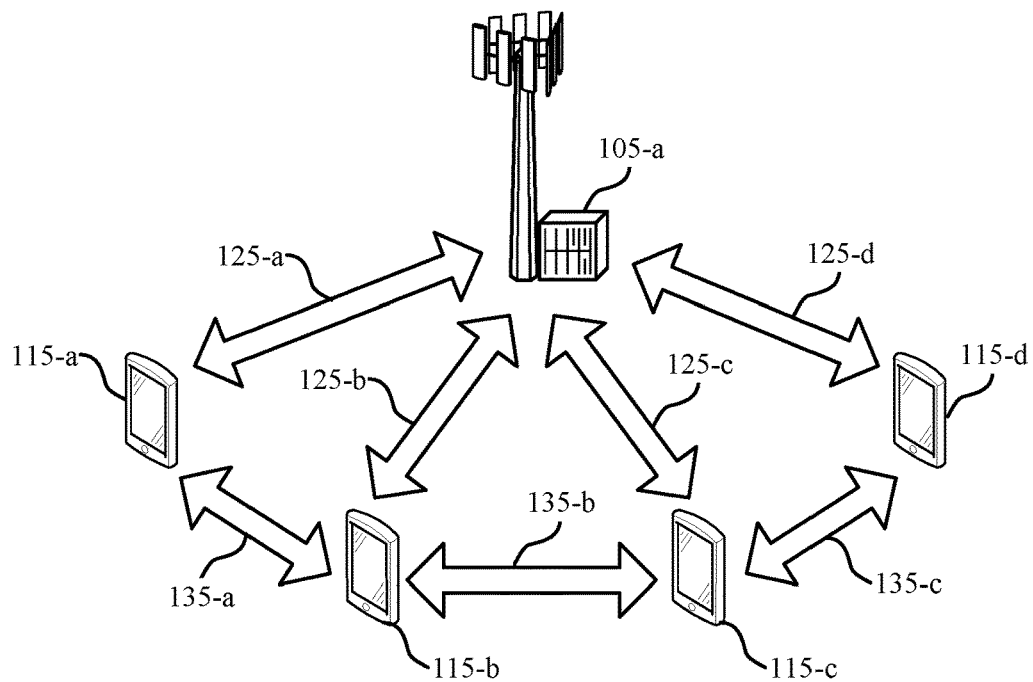
FIGS. 2A and 2B each illustrate an example of a wireless communications system that supports sidelink-induced Uu WUS in accordance with aspects of the present disclosure.
Figure 2B:
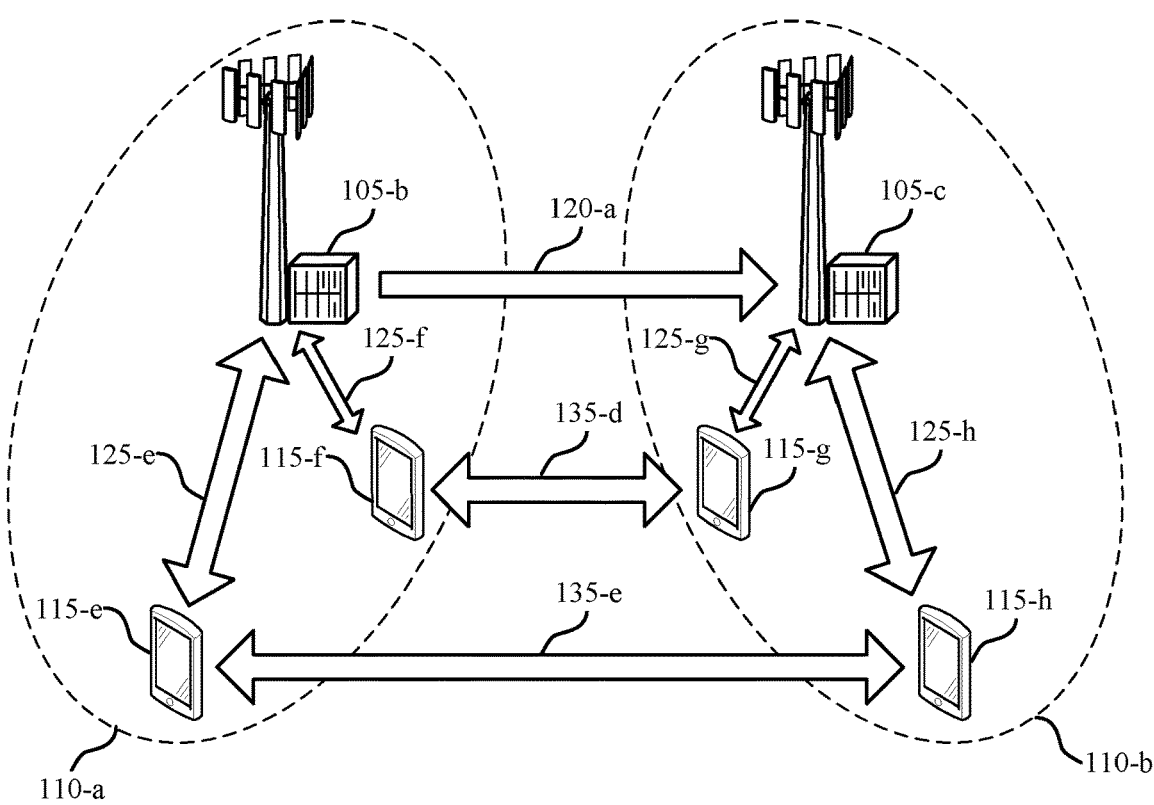

FIGS. 2A and 2B illustrates an example of a wireless communications system 201 and 202 respectively that each support sidelink-induced Uu WUS in accordance with aspects of the present disclosure.

With respect to FIG. 2A, in some examples, wireless communications system 201 may implement aspects of wireless communications system 100. For example, wireless communications system 201 may include UE 115-a, UE 115-b, UE 115-c, UE 115-d, and base station 105-a, which may be examples of UEs 115 and base station 105 as described with reference to FIG. 1. In some examples, base station 105-*a*, UE 115-*a*, UE 115-*b*, UE 115-*c*, and UE 115-*d* may transmit control signaling, data messages, or both using a direct communication link. For example, base station 105-*a* may transmit signaling to UE 115-*a*, UE 115-*b*, UE 115-*c*, UE 115-*d* or any combination thereof via communication links 125 (e.g., communication link 125-*a*, communication link 125-*b*, communication link 125-*c*, or communication link 125-*d* where each may be an example of an access link for Uu communications) or vice versa. Similarly, in some cases, UE 115-*a*, UE 115-*b*, UE 115-*c*, and UE 115-*d* may each communicate with another device via a sidelink communication link 135 (e.g., sidelink communication link 135-*a*, sidelink communication link 135-*b*, sidelink communication link 135-*c*, or sidelink communication link 135-*d*). For example, UE 115-*a* may transmit control signaling or data messages to UE 115-*b* via sidelink communication link 135-*a* or vice versa, UE 115-*b* may transmit control signaling or data messages to UE 115-*c* via sidelink communication link 135-*b* or vice versa, and UE 115-*c* may transmit control signaling or data messages to UE 115-*d* via sidelink communication link 135-*c* or vice versa.

Each of UE 115-*a*, UE 115-*b*, UE 115-*c* and UE 115-*d* may be configured with a power saving mode such as a DRX cycle mode. In some examples, a DRX cycle may include a number of active durations for receiving and transmitting messages and a number of inactive durations for conserving power. The UE 115-*a*, UE 115-*b*, UE 115-*c* and UE 115-*d* may wake-up for every active duration even when there are no communications to be received. To avoid unnecessary wake-ups, the base station 105-*a* may transmit a WUS to indicate that there are communications to be received. The WUs may be transmitted over a narrow band (e.g., a frequency band including a small number of subcarriers) and may use less power to be decoded by the receiving entity (e.g., UE 115-*a*, UE 115-*b*, UE 115-*c*, UE 115-*d*, or any combination thereof). In such examples, the UE 115-*a*, UE 115-*b*, UE 115-*c*, or UE 115-*d* may decode a subsequent PDCCH based on decoding a wake-up indicator (WI) received in a WUS. The UE 115-*a*, UE 115-*b*, UE 115-*c*, or UE 115-*d* may perform PDSCH decoding based on decoding the PDCCH. Further, the UE 115-*a*, UE 115-*b*, UE 115-*c*, or UE 115-*d* may remain in the active state for an amount of time (e.g., a preconfigured amount of time) following the successful reception of WUS (e.g., including decoding the WI) and may enter a deep sleep mode after the amount of time unless another PDCCH is received before the end of the active state amount of time. In some examples, there may be an timing offset between the end of a WUS transmission and the time PDCCH is transmitted by the base station 105-*a* to allow time for the UE 115-*a*, UE 115-*b*, UE 115-*c*, or UE 115-*d* to perform post wake-up operations (e.g., based on transitioning from the sleep mode). In some examples, the WUS may include a primary synchronization signal, a secondary synchronization signal, or both.

In the example of FIG. 2A, each of the UE 115-*a*, UE 115-*b*, UE 115-*c*, UE 115-*d* may be in a coverage area of the base station 105-*a*. In some examples, a first subset of UE (e.g., UE 115-*a*) may determine to perform sidelink communication with a second subset of UEs (e.g., UE 115-*b*, UE 115-*c*, or UE 115-*d*, or any combination thereof). In some other examples, the base station 105-*a* may determine that the first subset of UEs should perform sidelink communications with the second subset of UEs. One or more of the UE 115-*b*, UE 115-*c*, or UE 115-*d* may be configured with a DRX cycle for communications with the base station 105-*a* (e.g., Uu DRX cycle) and thus, the base station 105-*a* may be configured to wake-up the second subset of UEs for sidelink communications with the first subset of UEs.

For example, the UE 115-*a* may determine to perform sidelink communication (e.g., unicast and/or groupcast communications) with one more of UE 115-*b*, UE 115-*c*, or UE 115-*d*. In such examples, the UE 115-*a* may have previously performed sidelink communications with the UE 115-*b* via sidelink communication link 135-*a* (which may, for example, be an example of a PC5 communication link) and may have received or obtained a sidelink ID (e.g., sidelink layer1 (L1)/layer2 (L2)/layer3 (L3) ID) associated with the UE 115-*b*. Additionally, or alternatively the UE 115-*a* may receive sidelink IDs associated with UE 115-*c* or UE 115-*d* or both via communications with the UE 115-*b* or via previous sidelink communications performed on sidelink communication links (e.g., PC5 links) between the UE 115-*a* and the UE 115-*c* (not shown) or the UE 115-*a* and the UE 115-*d* (not shown) or both. For example, the UE 115-*b* may have performed sidelink communications with the UE 115-*c* and may have obtained the sidelink ID of the UE 115-*c* via sidelink communication link 135-*b* (which may be an example of a PC5 communication link) and may transmit the sidelink ID of the UE 115-*c* to the UE 115-*a* via the sidelink communication link 135-*a*. In some examples, the previous sidelink communications may include an indication of the DRX cycles of the UE 115-*b*, UE 115-*c*, or UE 115-*d*, or any combination thereof, that are configured by the base station 105-*a*.

The UE 115-*a* may determine with which of the UE 115-*b*, UE 115-*c*, or the UE 115-*d* to communicate and may transmit the corresponding sidelink IDs to the base station 105-*a* via communication link 125-*a*. The base station 105-*a* may associate the sidelink IDs of the UE 115-*b*, UE 115-*c*, or UE 115-*d* (e.g., those with which the UE 115-*a* intends to perform sidelink communications) with a corresponding access link ID (e.g., Uu ID). In some examples, the access link IDs may correspond to the cell radio network temporary ID (CRNTI) of the UE 115-*b*, UE 115-*c*, or UE 115-*d* respectively.

The base station 105-*a* may wake up UE 115-*b*, UE 115-*c*, or UE 115-*d* by transmitting a WUS to one or more of the UE 115-*b*, UE 115-*c*, or UE 115-*d* over the communication links 125-*b*, 125-*c*, or 125-*d* respectively. However, The UE 115-*b*, UE 115-*c*, or UE 115-*d* may perform different actions based on whether the WUS is for access link communications or sidelink communications and thus the base station may differentiate an access link WUS (e.g., a WUS transmitted over an access link for communicating with the base station over a communication link 125) from a sidelink-induced access link WUS (e.g., a WUS transmitted over an access link for communicating with the UE 115-*a* over a communication link 135). For example, the base station 105-*a* may transmit a sidelink-induced access link wakeup signal over a first set of frequency resources (e.g., that may or may not be UE specific, that may or may not be preconfigured) in a first set of time resources (e.g., one or more occasions, slots, mini-slots), while transmitting the access link WUS over a second set of frequency resources in the first set of time resources first or on a set of time resources. In some examples, the base station 105-*a* may transmit the sidelink-induced access link WUS using a first sequence (e.g., Zadoff Chu) over a first set of resources, while transmitting the access link WUS using a second sequence over the first or a different set of resources. Additionally, or alternatively, the base station 105-*a* may transmit a third sequence on the first or different set of resources to prompt both sidelink-induced access link wakeup for communications with the UE 115-*a* as well as access link wakeup for communications with the base station 105-*a*. The sets of frequency resources, the sets of time resources, the sets of resources and the different sequences (e.g., the first second and third sequence) may be configured statically, or semi-statically by higher layer signaling (e.g., RRC signaling).

In some examples, the different sequences may, additionally or alternatively correspond different sets of time and frequency resources in which the recipient is to remain in the active mode and perform subsequent sidelink communications. For example, the base station 105-*a* may transmit a first sequence that may indicate that the UE 115-*b*, UE 115-*c*, or the UE 115-*d* is to be awake for potentially performing sidelink communication for $N_1$ slots over a set of resources $R_1$, while a second sequence may indicate that the UE 115-*b*, UE 115-*c*, or the UE 115-*d* is to be awake for potentially performing sidelink communication for $N_2$ slots and/or over a second set of resources $R_2$.

In some examples, the control information payload (e.g., PDCCH payload) subsequent to the WUS may indicate whether the indicated wake-up is for access link, or sidelink or both. For example, the control information payload may indicate specific resource pools to be monitored by the UE 115-*b*, UE 115-*c*, or UE 115-*d*. In some examples, the control information payload may include other parameters of the wake-up (e.g., the number of slots). For example, a specific control information payload may be used to monitor specific resource-pool(s).

In some examples, the base station 105-*a* may transmit a group sidelink induced access link WUS for waking up the UE 115-*b*, UE 115-*c*, or the UE 115-*d* concurrently (e.g., for sidelink communications only) or may transmit a UE-specific sidelink induced access link WUS to one or more of the UE 115-*b*, UE 115-*c*, or the UE 115-*b* for prompting a wakeup. The UE 115-*a* may confirm that one or more of the UE 115-*b*, UE 115-*c*, or the UE 115-*d* (e.g., those that have been identified for performing sidelink communications) are woken up.

Based on receiving the sidelink-induced access link WUS, the receiving UE (e.g., any of UE 115-*b*, UE 115-*c*, or UE 115-*d*, but for the sake of clarity in this example, UE 115-*b*) may perform a correlation of the sequence received in a first set of resources with the first sequence (e.g., which may indicate sidelink-induced access link wakeup) and/or may perform a correlation of a sequence received on the first or different set of resources with a second preconfigured sequence (e.g., indicating access link wakeup), and/or may perform a correlation of a sequence received on the first or different set of resources with a third preconfigured sequence (e.g., indicating both access link wakeup and sidelink-induced access link).

The UE 115-*b* may detect the presence of the first sequence (e.g., associated with wake-up for sidelink communications) and may activate (e.g., switch, turn on) a transceiver chain corresponding to uplink communications during the active period (e.g., duration) for subsequent sidelink communications. The length of the active duration may depend on the transmitted sequence. The UE 115-*b* may detect the presence of the second sequence (e.g., associated with wake-up for access link communications) or the third sequence (e.g., associated with both access link and sidelink communications) and may activate (e.g., switch, turn on) one or more transceiver chains corresponding to uplink communications and downlink communications during the active period (e.g., duration) for subsequent communications. In some examples, the UE 115-*b* detects the presence of both the first and second sequence. In such examples, the length of the active duration is the larger of the length of the active duration associated with access link DRX, and the length of the active duration associated with sidelink DRX.

In some examples, the base station 105-*a* may transmit UE-specific or group WUS based on receiving a sidelink scheduling request or buffer status report from the UE 115-*a*. For example, the sidelink IDs reported to the base station 105-*a* by the UE 115-*a* may be included in the buffer status report. In some examples, the UE 115-*a* determines to initiate sidelink communications with one or more of the UE 115-*b*, UE 115-*c*, or UE 115-*d* and may transmit a scheduling request/buffer status report to the base station 105-*a*. The buffer status report may include the SL IDs of the UE 115-*b*, UE 115-*c*, or UE 115-*d*. Upon receiving the scheduling request/buffer status report from the UE 115-*a*, the base station 105-*a* may map the SL IDs to the corresponding access link IDs. The base statin 105-*a* may transmit a UE-specific sidelink-induced WUS or group sidelink-induced WUS as described herein.

In some other examples, the UE 115-*a* may transmit a buffer status report from including the sidelink IDs from which the base station 105-*a* may determine that the buffer of the UE 115-*a* is greater than a threshold. The base station 105-*a* may transmit one or more WUS to the UE 115-*b*, UE 115-*c*, and the UE 115-*d* to prompt the UE 115-*b*, UE 115-*c*, and the UE 115-*d* to enter the active mode such that the UE 115-*a* may offload the buffered data.

With respect to FIG. 2B, in some examples, wireless communications system 202 may implement aspects of wireless communications system 100 and/or wireless communications system 201. For example, wireless communications system 202 may include UE 115-*e*, UE 115-*f*, UE 115-*g*, UE 115-*h*, as well as base station 105-*b* and base station 105-*c*, which may be examples of UEs 115 and base station 105 as described with reference to FIG. 1. In some examples, UE 115-*e* and UE 115-*f* may be in a coverage area 110-*a* of base station 105-*b* and UE 115-*g* and UE 115-*h* may be in a coverage area 110-*b* or base station 105-*c*, each of which may transmit control signaling, data messages, or both using a direct communication link. For example, base station 105-*b* may transmit signaling to UE 115-*e* and UE 115-*f* via communication links 125 (e.g., communication link 125-*e* and communication link 125-*f*) or vice versa, and base station 105-*c* may transmit signaling to UE 115-*g* and UE 115-*h* via communication links 125 (e.g., communication link 125-*g* and communication link 125-*h*) or vice versa. Similarly, in some cases, UE 115-*e*, UE 115-*f*, UE 115-*g*, and UE 115-*h* may each communicate with another device via a sidelink communication link 135 (e.g., sidelink communication link 135-*d* and sidelink communication link 135-*e*). For example, UE 115-*e* may transmit control signaling or data messages to UE 115-*h* via sidelink communication link 135-*e* or vice versa, and UE 115-*f* may transmit control signaling or data messages to UE 115-*g* via sidelink communication link 135-*d* or vice versa. Additionally, or alternatively base station 105-*b* may transmit signaling (e.g., X2 signaling) to base station 105-*c* via backhaul link 120-*a*.

In some examples, a first subset of UE (e.g., UE 115-*e*) may determine to perform sidelink communication with a second subset of UEs (e.g., UE 115-*f*, UE 115-*g*, or UE 115-*h*, or any combination thereof). In some other examples, the base station 105-*a* may determine that the first subset of UEs should perform sidelink communications with the second subset of UEs. One or more of the UE 115-*f*, UE 115-*g*, or UE 115-*h* may be configured with a DRX cycle for communications with the base station 105-*a* (e.g., Uu DRX cycle) and thus, the base stations 105-*a* and 105-*b* may be configured to wake-up the UEs of second subset of UEs that are in the corresponding coverage area for sidelink communications with the first subset of UEs.

For example, the UE 115-*e* may determine to perform sidelink communication (e.g., unicast and/or groupcast communications) with one more of UE 115-*f*, UE 115-*g*, or UE 115-*h*. In such examples, the UE 115-*e* may have previously performed sidelink communications with the UE 115-*h* via sidelink communication link 135-*e* (which may, for example, be an example of a PC5 communication link) and may have received or obtained a sidelink ID (e.g., sidelink layer1 (L1)/layer2 (L2)/layer3 (L3) ID) associated with the UE 115-*h*.

In the example, of FIG. 2B, the UE 115-*e* in coverage area 110-*a* may determine to communicate with UE 115-*h* in the coverage area 110-*b*. That is UE 115-*e* may be served by base station 105-*b* and UE 115-*h* may be served by base station 105-*c*. The UE 115-*e* may transmit the sidelink ID of UE 115-*h* to the base station 105-*b* via communication link 125-*e*. The base station 105-*a* may associate the sidelink ID of the UE 115-*h* with a corresponding access link ID (e.g., Uu ID). However, the base station 105-*b* may determine that the UE 115-*h* is connected to (e.g., served by) the base station 105-*c* and may not be configured to transmit a WUS to the UE 115-*h*. In such examples, the base station 105-*b* may transmit X2 signaling to the base station 105-*c* via backhaul link 120-*a* which may request that the base station 105-*c* transmit a sidelink-induced WUS to the UE 115-*h*. Other aspects of the communications between the UE 115-*e*, UE 115-*f*, UE 115-*g*, or the UE 115-*h*, base station 105-*b* and base station 105-*c* may be performed similarly to those described with reference to FIG. 2A.

Figure 3:
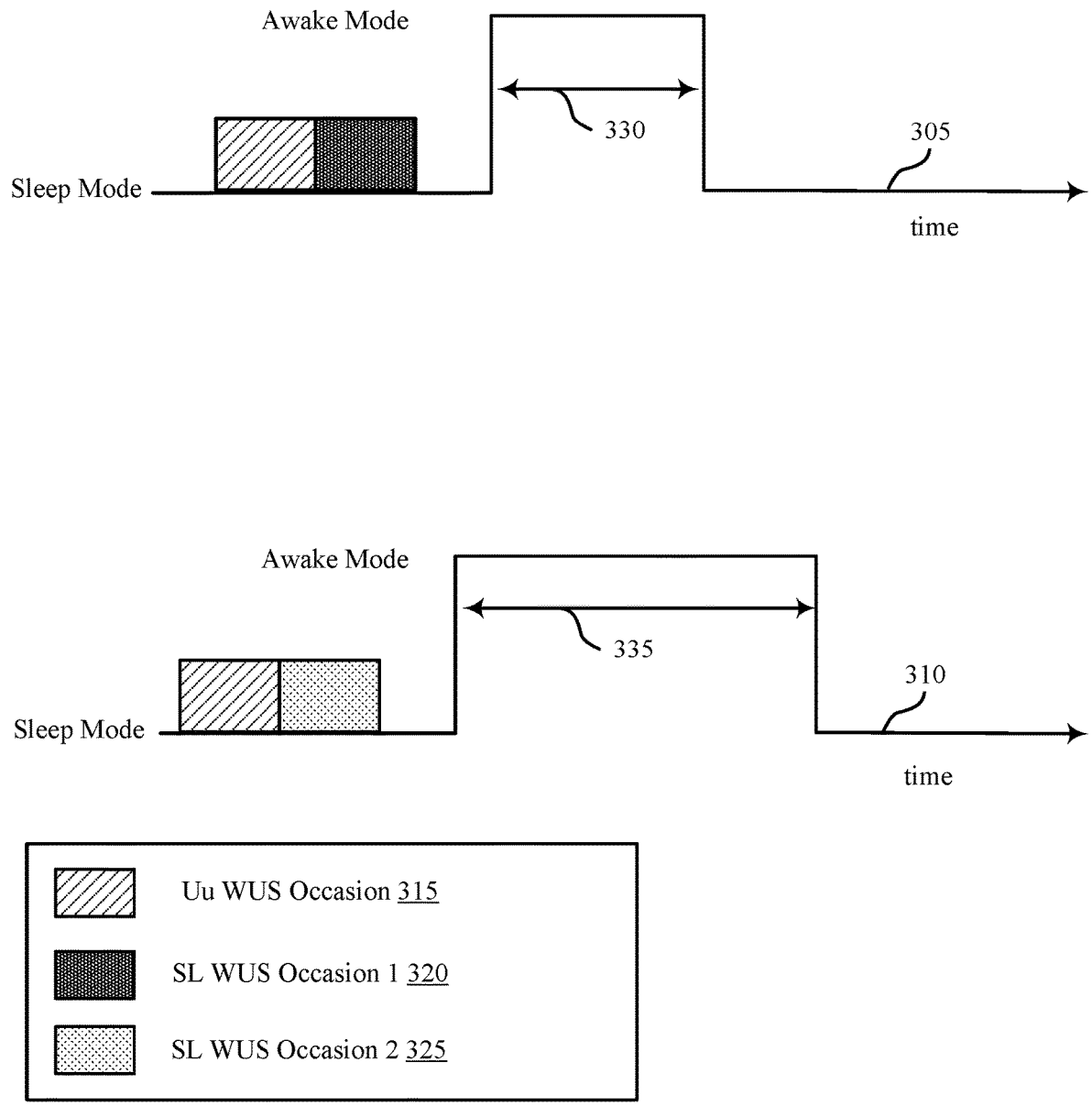
FIG. 3 illustrates an example of a WUS timing configuration that supports sidelink-induced Uu WUS in accordance with aspects of the present disclosure.

FIG. 3 illustrates an example of a WUS timing configuration 300 that supports sidelink-induced Uu WUS in accordance with aspects of the present disclosure. In some examples, WUS timing configuration 300 may implement aspects of wireless communications system 100 and wireless communications system 200. WUS timing configuration 300 may illustrate an example timing of sequences transmitted by a base station (e.g., base station 105) to prompt wake-up at a UE (e.g., UE 115) operating according to a DRX cycle.

In a first example 305, a UE may be operating according to a sleep mode and may receive a WUS during Uu WUS Occasion 315. Based on receiving the WUS during the Uu WUS Occasion 315 the UE may determine to enter an active mode for access link communications with a base station for a duration of time. Additionally, or alternatively, the UE may receive a second WUS during sidelink WUS Occasion 1 320 which may be associated with a first active duration 330. That is, a WUS indicator received during sidelink WUS Occasion 1 320 may indicate that the UE is to enter the active mode for a first duration of time 330. Based on receiving the WUS during the sidelink WUS Occasion 1 320, the UE may determine to enter an active mode for sidelink communications with another UE for the first duration of time 330 and may reenter the sleep mode after the first duration of time 330.

In a second example 310, the UE may be operating according to a sleep mode and may receive a WUS during Uu WUS Occasion 315. Based on receiving the WUs during the Uu WUS Occasion 315 the UE may determine to enter an active mode for access link communications with a base station for a duration. Additionally, or alternatively, the UE may receive a second WUS during sidelink WUS Occasion 2 325 which may be associated with a second active duration 335. That is, a WUS indicator received during sidelink WUS Occasion 2 325 may indicate that the UE is to enter the active mode for a second duration of time 335. Based on receiving the WUS during the sidelink WUS Occasion 2 325, the UE may determine to enter the active mode for sidelink communications with another UE for the second duration of time 335 and may reenter the sleep mode after the second duration of time 335.

Figure 4:
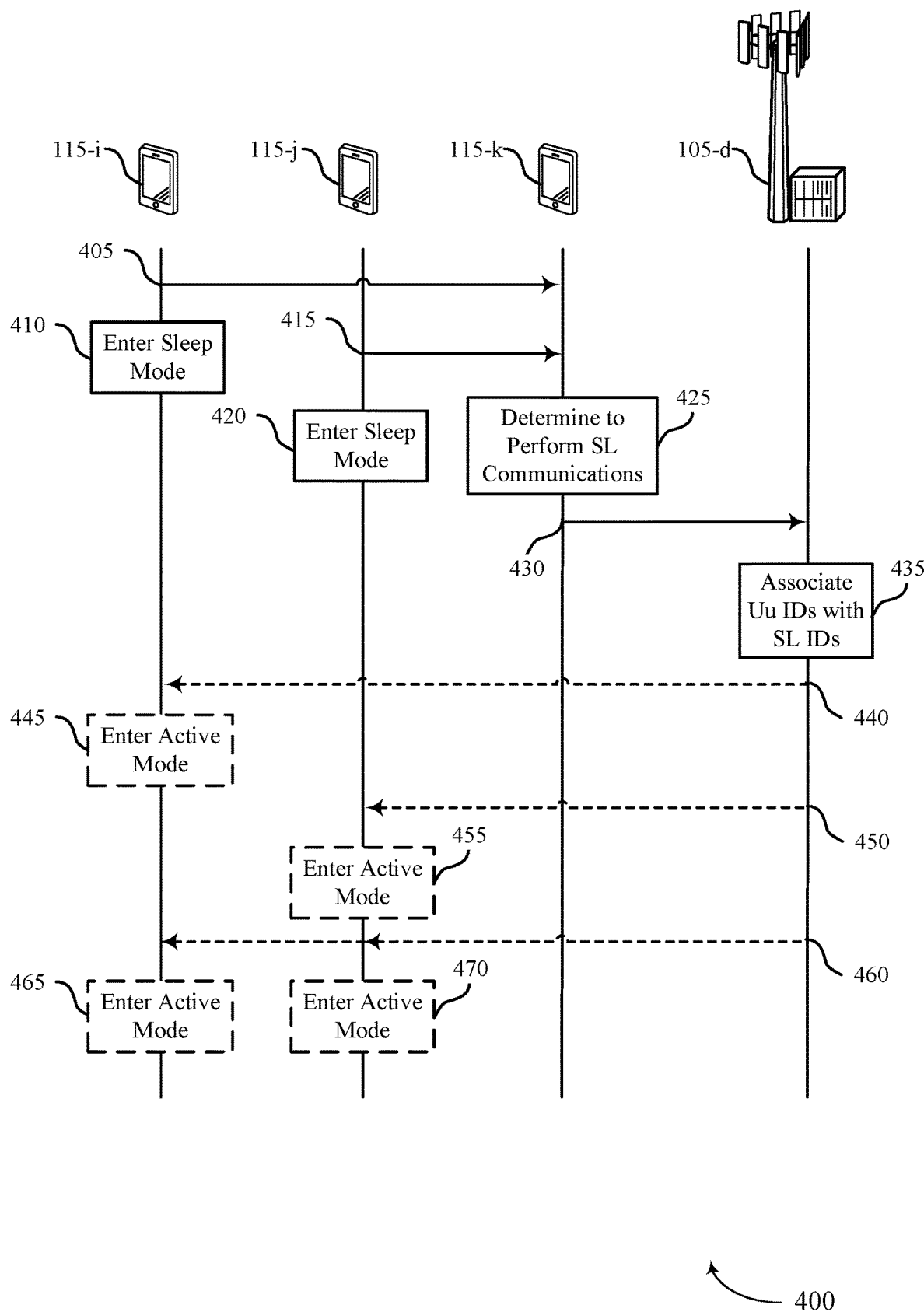
FIG. 4 illustrates an example of a process flow that supports sidelink-induced Uu WUS in accordance with aspects of the present disclosure.

FIG. 4 illustrates an example of a process flow 400 that supports sidelink-induced Uu WUS in accordance with aspects of the present disclosure. In some examples, process flow 400 may implement aspects of wireless communications system 100, wireless communications system 200, and WUS timing configuration 300. The process flow 400 may include UE 115-I, UE 115-*j*, and UE 115-*k* as well as base station 105-*d*. Alternative examples of the following may be implemented, where some processes are performed in a different order than described or are not performed or are perform by different entities. In some cases, processes may include additional features not explicitly detailed below, or further processes may be added.

At 405, the UE 115-*i* in a coverage area of the base station 105-*d* may transmit a sidelink communication to the UE 115-*k*. In some examples, the UE 115-*i* may transmit the sidelink communication while in an active duration of a power saving mode (e.g., DRX mode) of the UE 115-*i*. The sidelink communication may include a sidelink ID of the UE 115-*i*. At 410, the UE 115-*i* may enter an inactive mode after the active mode duration expires, for example, or based on one or more configurations of the power savings mode of the UE 115-*i*. At 415, the UE 115-*j* in the coverage area of the base station 105-*d* may transmit a sidelink communication to the UE 115-*k*. In some examples, the UE 115-*j* may transmit the sidelink communication while in an active duration of a power saving mode (e.g., DRX mode) of the UE 115-*j*. The sidelink communication may include a sidelink ID of the UE 115-*j*. At 420, the UE 115-*j* may enter an inactive mode after the active mode duration expires, for example, or based on one or more configurations of the power savings mode of the UE 115-*j*.

At 425, the UE 115-*k* may determine to communicate with one or more of the UE 115-*i* and the UE 115-*j*. For example, the UE 115-*k* may determine to perform a unicast communications with UE 115-*i*, or UE 115-*j*, or both, or may determine to perform groupcast communications with the UE 115-*i* and the UE 115-*j*. Based on receiving the sidelink communications from UE 115-*i* at 405 and the sidelink communications from UE 115-*j* at 415, the UE 115-*k* may obtain the sidelink IDs of the UEs with which it has determined to communicate. For example, the UE 115-*k* may receive the sidelink L1, or L2, or L3, ID of the UE 115-*i* at 405 and may receive the sidelink L1, or L2, or L3, ID of the UE 115-*j* at 415.

At 430, based on determining to communicate with one or more of the UE 115-*i* and the UE 115-*j*, the UE 115-*k* may transmit an uplink message to the base station 105-*d*. For example, the UE 115-*k* may indicate with which UEs the UE 115-*k* has determined to communicate by including the corresponding sidelink IDs in the uplink communication to the base station 105-*d*.

At 435, the base station may associate the received sidelink IDs of the UE 115-*i*, the UE 115-*j*, or both, with a corresponding access link ID (e.g., Uu ID) of the UE 115-*i*, the UE 115-*j*, or both. In some examples, the access link IDs of the UE 115-*i*, the UE 115-*j*, or both may correspond to the CRNTI of the UE 115-*i*, the UE 115-*j*, or both.

At 440, 450, or 460, the base station 105-*d* may transmit a sidelink-induced access link WUS for communications with the UE 115-*k* in a first set of resources (e.g., that may or may not be UE-specific, or preconfigured, or both) on a first set of time resources (e.g., occasion, slot, mini-slot), while transmitting an access link WUS (e.g., default Uu WUS) for communications with the base station 105-*d* in a second set of resources on the first set of time resources or on a different set of time resources.

In some examples, the base station 105-*d* may transmit the sidelink-induced access link WUS using a first sequence (e.g., Zadoff Chu) on a first set of time resources and may transmit the access link WUS (e.g., default Uu WUS) using a second sequence on the first set of time resources or a different set of time resources. In some examples, the base station 105-*d* may transmit a third sequence on the first set of time resources or the different set of time resources to indicate both sidelink-induced access link wake-up as well as the access link wake-up (e.g., default Uu wake-up).

In some examples, the base station 105-*d* may transmit different sequences to indicate to the indicated UEs to wake up for a different number of time or frequency resources, or both to perform subsequent sidelink communications. For example, the first sequence may correspond to a first set of time resources and a first set of frequency resources for performing communications in the active duration, while the second sequence may correspond to a second set of time resources and a second set of frequency resources for performing communications in the active duration.

For example, at 440, the base station 105 may transmit a first UE-specific WUS, which may be an example of any of the WUS described herein, to the UE 115-*i* which may enter the active mode at 445. For example, the UE 115-*i* may receive the WUS and determine whether the WUS is for sidelink communications or access link communications, or both based on the WUS configuration. Based on the WUS configuration, the UE 115-*i* may determine to activate a set of communication components corresponding to the communications to be performed. For example, if the WUS indicates the UE 115-*i* is to wake up for sidelink communications, the UE 115-*i* may activate the corresponding uplink components and if the WUS indicates the UE 115-*i* is to wake up for sidelink communications and access link communications the UE 115-*i* may activate the corresponding uplink components and may activate the corresponding downlink components. Additionally, or alternatively, the WUS-induced active duration may depend on the WUS configuration. For example, if the WUS indicates the UE 115-*i* is to wake up for sidelink communications, the active duration may correspond to a first duration and if the WUS indicates the UE 115-*i* is to wake up for sidelink communications and access link communications the active duration may correspond to a second duration. In some examples, the WUS configuration may indicates whether wake-up is for access link communications, or sidelink communications, or both. For example, the WUS may indicate a set of resource pools to be monitored by the receiving UE. The WUS may additionally or alternatively include other parameters of the wake-up (e.g., a number of slots). In some examples, a specific WUS could indicate one or more specific resource-pools to be monitored.

For example, at 450, the base station 105 may transmit a second UE-specific WUS, which may be an example of any of the WUS described herein, to the UE 115-*j* which may enter the active mode at 455. For example, the UE 115-*j* may receive the WUS and determine whether the WUS is for sidelink communications or access link communications, or both based on the WUS configuration. Based on the WUS configuration, the UE 115-*j* may determine to activate a set of communication components corresponding to the communications to be performed. For example, if the WUS indicates the UE 115-*j* is to wake up for sidelink communications, the UE 115-*j* may activate the corresponding uplink components and if the WUS indicates the UE 115-*j* is to wake up for sidelink communications and access link communications the UE 115-*j* may activate the corresponding uplink components and may activate the corresponding downlink components. Additionally, or alternatively, the WUS-induced active duration may depend on the WUS configuration. For example, if the WUS indicates the UE 115-*j* is to wake up for sidelink communications, the active duration may correspond to a first duration and if the WUS indicates the UE 115-*j* is to wake up for sidelink communications and access link communications the active duration may correspond to a second duration.

At 460, the base station 105 may transmit a group WUS, which may be an example of any of the WUS described herein, to the UE 115-*i* and the UE 115-*j* which may each enter the active mode at 465 and 470 concurrently. For example, the UE 115-*i* and the UE 115-*j* may perform actions similar to those described with reference to the actions performed at 445 and/or 455 based on receiving the group WUS.

Each of the UE 115-*i*, the UE 115-*j*, may perform communications with the UE 115-*k* or the base station 105-*d*, or both while in the active duration.

Figure 5:
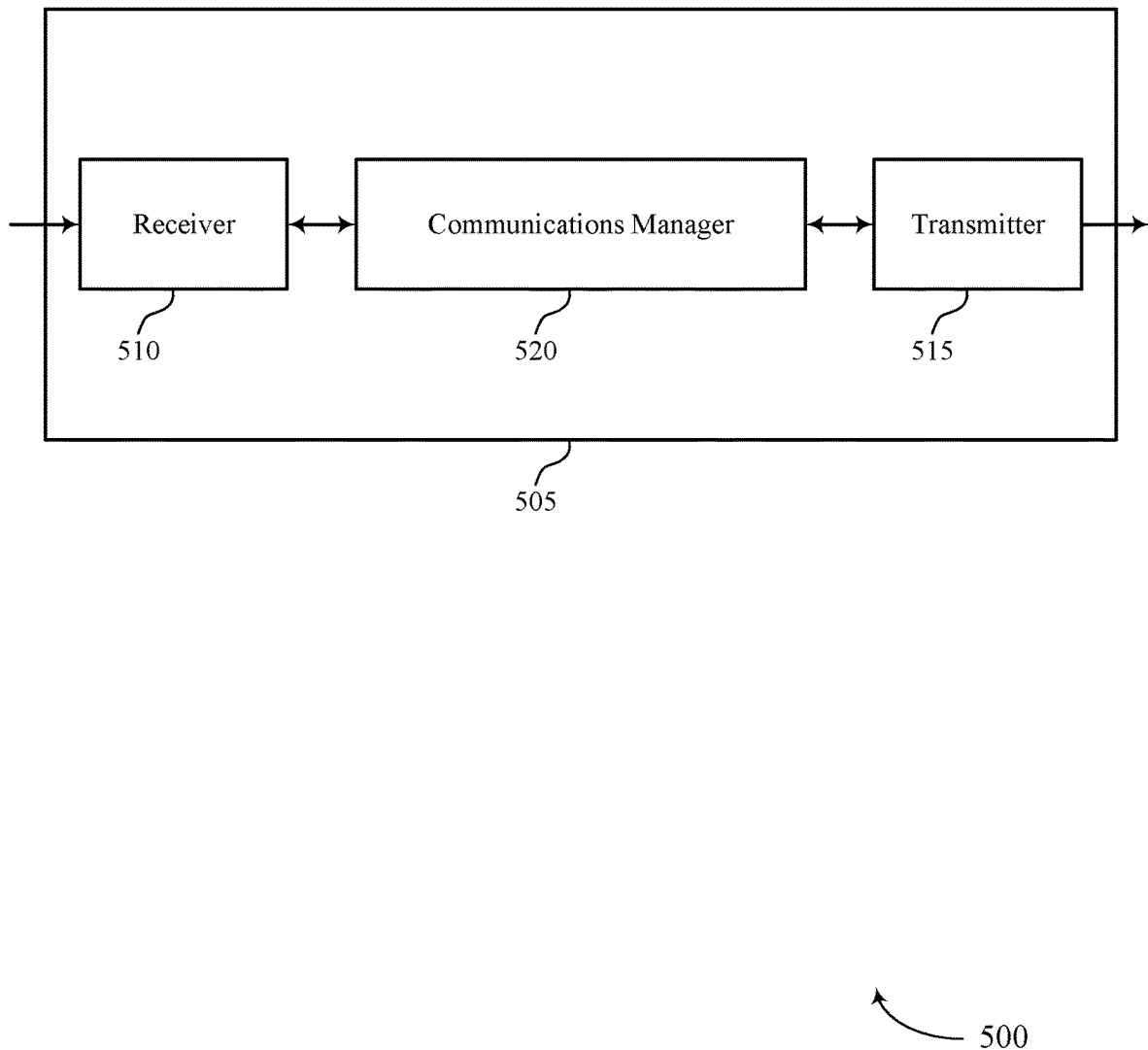
FIGS. 5 and 6 show block diagrams of devices that support sidelink-induced Uu WUS in accordance with aspects of the present disclosure.

FIG. 5 shows a block diagram 500 of a device 505 that supports sidelink-induced Uu WUS in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to sidelink-induced Uu WUS). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to sidelink-induced Uu WUS). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of sidelink-induced Uu WUS as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an ASIC, a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a base station in accordance with examples as disclosed herein. For example, the communications manager 520 may be configured as or otherwise support a means for receiving, from a first UE, an uplink message that includes a set of one or more sidelink communication identifications each associated with a different UE of a set of one or more UEs. The communications manager 520 may be configured as or otherwise support a means for associating, based on receiving the uplink message from the first UE, each of the set of one or more sidelink communication identifications with a corresponding second identification of a set of second identifications, each of the set of second identifications also associated with each of the set of one or more UEs. The communications manager 520 may be configured as or otherwise support a means for transmitting one or more signals for transitioning each of the set of one or more UEs associated with the set of second identifications from an inactive mode to an active mode based on associating each of the set of one or more sidelink communication identifications with the second identification of the set of second identifications.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption and reduced processing.

Figure 6:
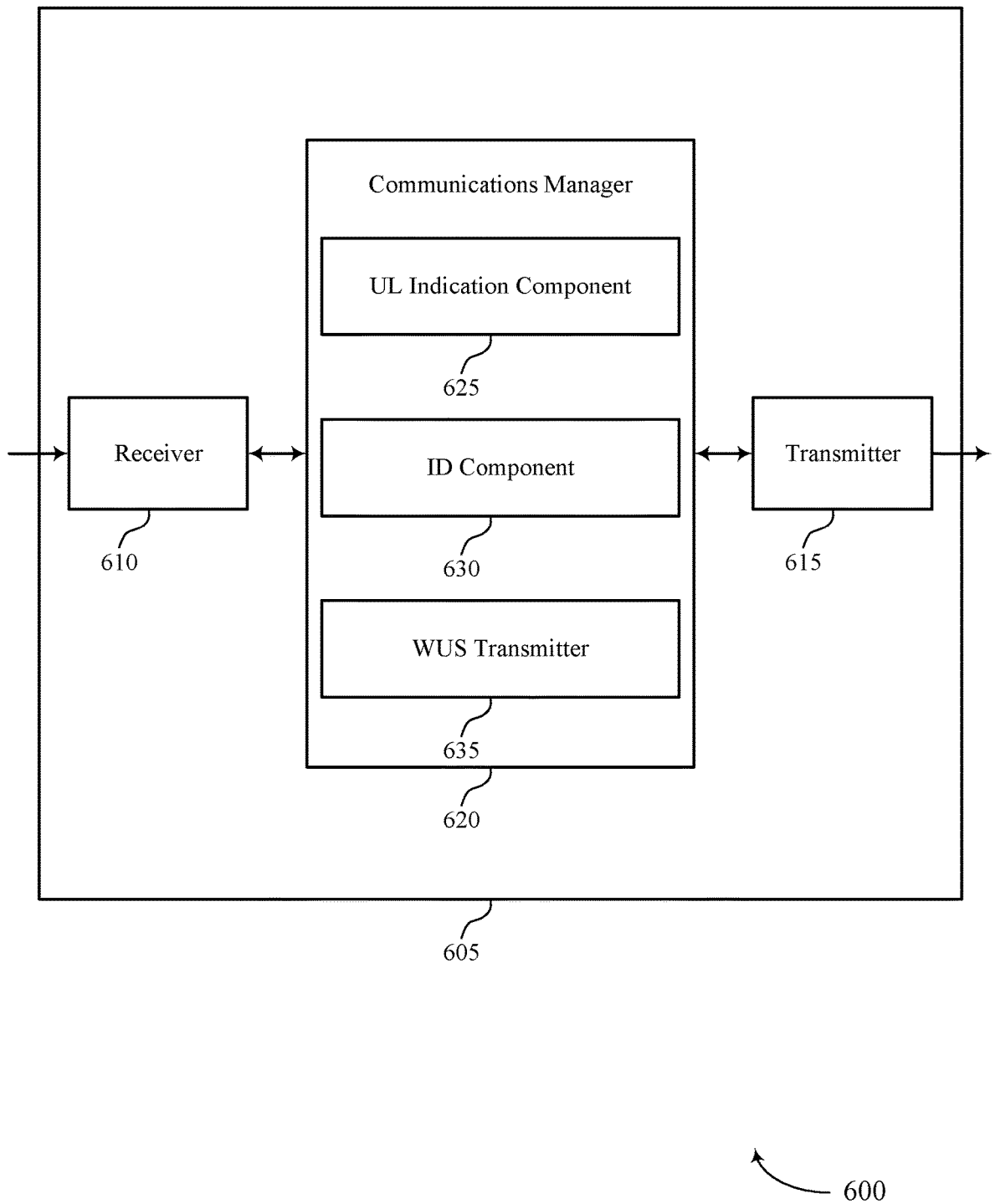

FIG. 6 shows a block diagram 600 of a device 605 that supports sidelink-induced Uu WUS in accordance with aspects of the present disclosure. The device 605 may be an example of aspects of a device 505 or a base station 105 as described herein. The device 605 may include a receiver 610, a transmitter 615, and a communications manager 620.

The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sidelink-induced Uu WUS). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sidelink-induced Uu WUS). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of sidelink-induced Uu WUS as described herein. For example, the communications manager 620 may include an uplink (UL) indication component 625, an ID component 630, a WUS transmitter 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a base station in accordance with examples as disclosed herein. The UL indication component 625 may be configured as or otherwise support a means for receiving, from a first UE, an uplink message that includes a set of one or more sidelink communication identifications each associated with a different UE of a set of one or more UEs. The ID component 630 may be configured as or otherwise support a means for associating, based on receiving the uplink message from the first UE, each of the set of one or more sidelink communication identifications with a corresponding second identification of a set of second identifications, each of the set of second identifications also associated with each of the set of one or more UEs. The WUS transmitter 635 may be configured as or otherwise support a means for transmitting one or more signals for transitioning each of the set of one or more UEs associated with the set of second identifications from an inactive mode to an active mode based on associating each of the set of one or more sidelink communication identifications with the second identification of the set of second identifications.

Figure 7:
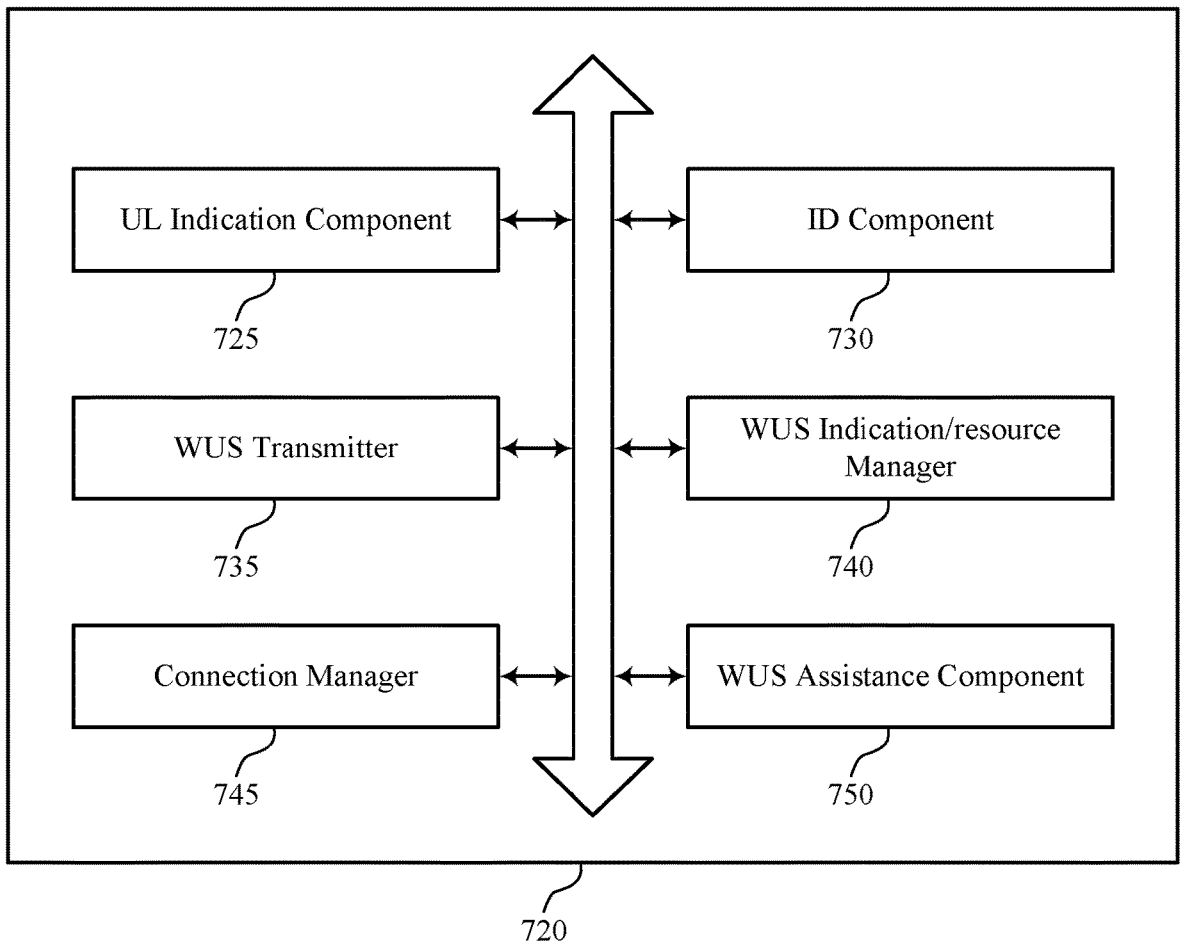
FIG. 7 shows a block diagram of a communications manager that supports sidelink-induced Uu WUS in accordance with aspects of the present disclosure.

FIG. 7 shows a block diagram 700 of a communications manager 720 that supports sidelink-induced Uu WUS in accordance with aspects of the present disclosure. The communications manager 720 may be an example of aspects of a communications manager 520, a communications manager 620, or both, as described herein. The communications manager 720, or various components thereof, may be an example of means for performing various aspects of sidelink-induced Uu WUS as described herein. For example, the communications manager 720 may include an UL indication component 725, an ID component 730, a WUS transmitter 735, a WUS indication/resource manager 740, a connection manager 745, a WUS assistance component 750, or any combination thereof. Each of these components may communicate, directly or indirectly, with one another (e.g., via one or more buses).

The communications manager 720 may support wireless communication at a base station in accordance with examples as disclosed herein. The UL indication component 725 may be configured as or otherwise support a means for receiving, from a first UE, an uplink message that includes a set of one or more sidelink communication identifications each associated with a different UE of a set of one or more UEs. The ID component 730 may be configured as or otherwise support a means for associating, based on receiving the uplink message from the first UE, each of the set of one or more sidelink communication identifications with a corresponding second identification of a set of second identifications, each of the set of second identifications also associated with each of the set of one or more UEs. The WUS transmitter 735 may be configured as or otherwise support a means for transmitting one or more signals for transitioning each of the set of one or more UEs associated with the set of second identifications from an inactive mode to an active mode based on associating each of the set of one or more sidelink communication identifications with the second identification of the set of second identifications.

In some examples, to support transmitting the one or more signals, the WUS transmitter 735 may be configured as or otherwise support a means for transmitting the one or more signals using a first set of resources that is different from a second set of resources used to transmit a wake-up signal for transitioning each of the set of one or more UEs from the inactive mode to the active mode for base station-UE communications.

In some examples, to support transmitting the one or more signals, the WUS transmitter 735 may be configured as or otherwise support a means for transmitting the one or more signals using a first sequence that is different from a second sequence used to transmit a wake-up signal for transitioning each of the set of one or more UEs from the inactive mode to the active mode for base station-UE communications.

In some examples, to support transmitting the one or more signals, the WUS transmitter 735 may be configured as or otherwise support a means for transmitting the one or more signals using a sequence that is indicative of a wake-up signal for transitioning each of the set of one or more UEs from the inactive mode to the active mode for both the sidelink communications and base station-UE communications.

In some examples, the WUS indication/resource manager 740 may be configured as or otherwise support a means for transmitting radio resource control signaling in order to configure the set of one or more UEs with resources or sequences to be used in the transmitting of the one or more signals, where the resources or sequences are different from wake-up resources or sequences used for base station-UE communications.

In some examples, to support transmitting the one or more signals, the WUS transmitter 735 may be configured as or otherwise support a means for transmitting the one or more signals as wake-up signals that include first payloads that indicate that the wake-up signals are for transitioning each of the set of one or more UEs from the inactive mode to the active mode for the sidelink communications during a first duration of time, where the first payloads are different from second payloads that indicate that the wake-up signals are for transitioning each of the set of one or more UEs for base station-UE communications or for both the sidelink communications and the base station-UE communications during a second duration of time.

In some examples, to support transmitting the one or more signals, the WUS transmitter 735 may be configured as or otherwise support a means for transmitting the one or more signals as wake-up signals that include an indication of a first pool of resources for the set of one or more UEs to monitor for sidelink communications after transitioning from the inactive mode to the active mode, where the first pool of resources is different from a second pool of resources configured for base station-UE communications.

In some examples, to support transmitting the one or more signals, the WUS transmitter 735 may be configured as or otherwise support a means for transmitting a group wake-up signal to each of the set of one or more UEs.

In some examples, the connection manager 745 may be configured as or otherwise support a means for determining that at least one UE of the set of one or more UEs is connected to a second base station. In some examples, the WUS assistance component 750 may be configured as or otherwise support a means for transmitting, to the second base station, a message that includes a sidelink communication identification of the at least one UE to trigger the second base station to transmit a wake-up signal to the at least one UE.

In some examples, the message is transmitted via an X2 interface.

In some examples, to support receiving the uplink message, the UL indication component 725 may be configured as or otherwise support a means for receiving either a scheduling request or a buffer status report as the uplink message.

In some examples, the one or more sidelink communication identifications include layer 1 identifiers, layer 2 identifiers, or layer 3 identifiers and the set of second identifications includes a set of Uu interface identifiers.

In some examples, the set of Uu interface identifiers includes a set of cell radio network temporary identifiers.

Figure 8:
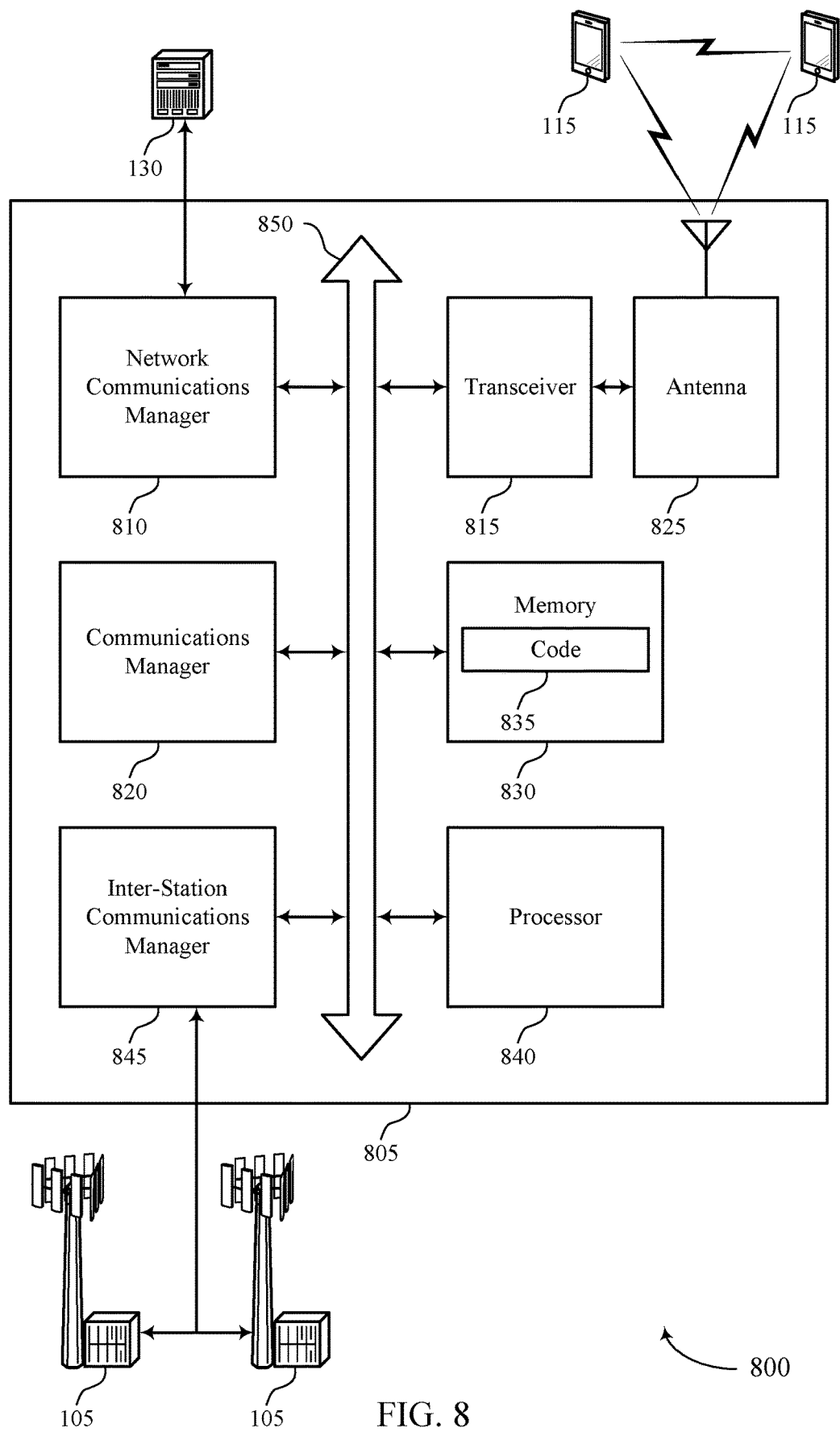
FIG. 8 shows a diagram of a system including a device that supports sidelink-induced Uu WUS in accordance with aspects of the present disclosure.

FIG. 8 shows a diagram of a system 800 including a device 805 that supports sidelink-induced Uu WUS in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random-access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink-induced Uu WUS). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105 and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a base station in accordance with examples as disclosed herein. For example, the communications manager 820 may be configured as or otherwise support a means for receiving, from a first UE, an uplink message that includes a set of one or more sidelink communication identifications each associated with a different UE of a set of one or more UEs. The communications manager 820 may be configured as or otherwise support a means for associating, based on receiving the uplink message from the first UE, each of the set of one or more sidelink communication identifications with a corresponding second identification of a set of second identifications, each of the set of second identifications also associated with each of the set of one or more UEs. The communications manager 820 may be configured as or otherwise support a means for transmitting one or more signals for transitioning each of the set of one or more UEs associated with the set of second identifications from an inactive mode to an active mode based on associating each of the set of one or more sidelink communication identifications with the second identification of the set of second identifications.

By including or configuring the communications manager 820 in accordance with examples as described herein, the device 805 may support techniques for reduced power consumption, improved user experience related to reduced processing, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of sidelink-induced Uu WUS as described herein, or the processor 840 and the memory 830 may be otherwise configured to perform or support such operations.

Figure 9:
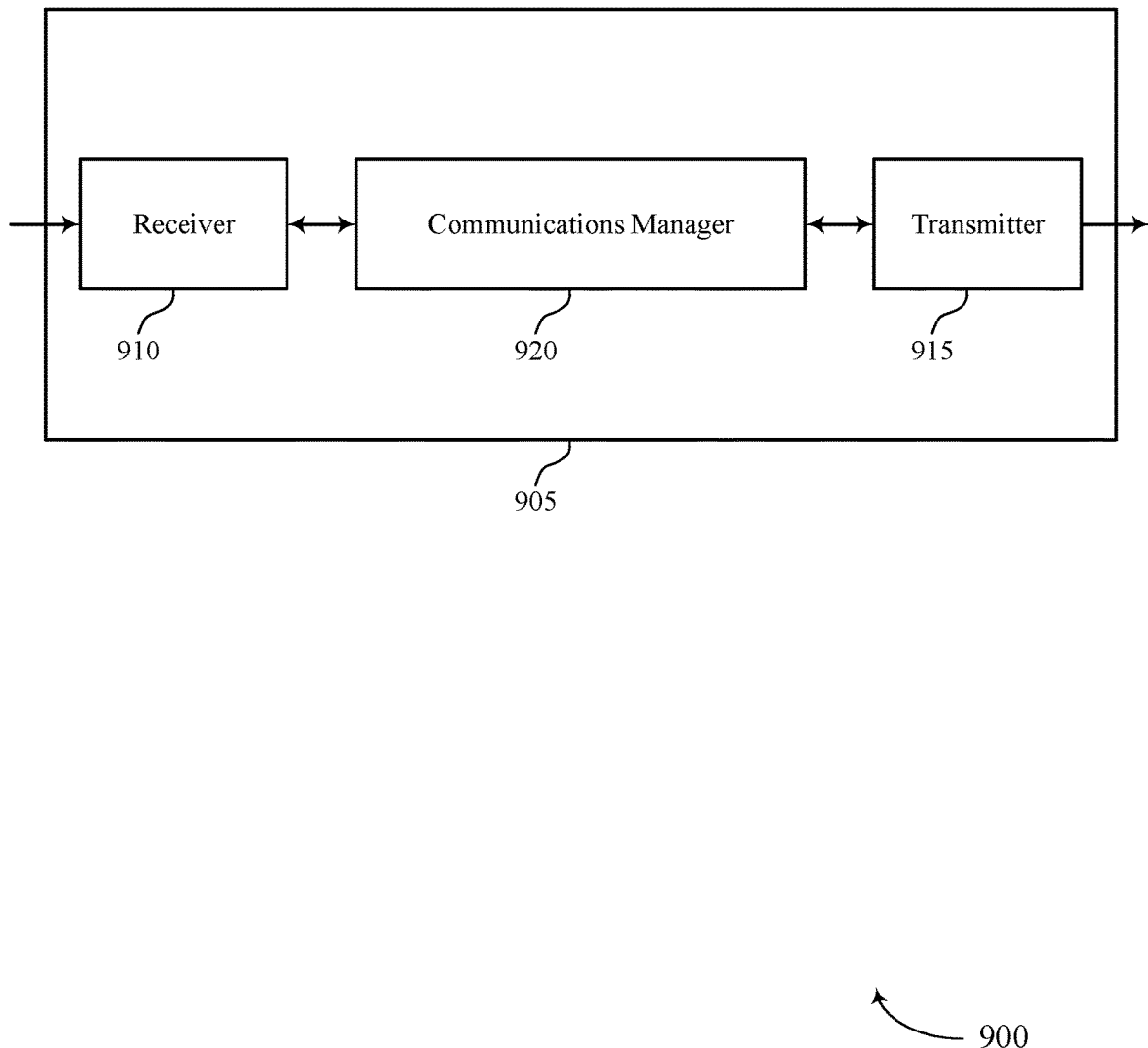
FIGS. 9 and 10 show block diagrams of devices that support sidelink-induced Uu WUS in accordance with aspects of the present disclosure.

FIG. 9 shows a block diagram 900 of a device 905 that supports sidelink-induced Uu WUS in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to sidelink-induced Uu WUS). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to sidelink-induced Uu WUS). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of sidelink-induced Uu WUS as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first UE in accordance with examples as disclosed herein. For example, the communications manager 920 may be configured as or otherwise support a means for receiving, from a second UE that is in an active mode, a sidelink message that includes an identification of the second UE. The communications manager 920 may be configured as or otherwise support a means for determining, subsequent to receiving the identification of the second UE, to further communicate via sidelink communications with the second UE while the second UE is in an idle mode. The communications manager 920 may be configured as or otherwise support a means for transmitting an uplink message to a base station to trigger the base station to send a wake-up signal to the second UE, the uplink message including the identification of the second UE. The communications manager 920 may be configured as or otherwise support a means for communicating with the second UE once the second UE has re-entered the active mode subsequent to transmission of the uplink message.

Additionally, or alternatively, the communications manager 920 may support wireless communication at a second UE in accordance with examples as disclosed herein. For example, the communications manager 920 may be configured as or otherwise support a means for transmitting, while in an active mode to a first UE, a sidelink message that includes an identification of the second UE. The communications manager 920 may be configured as or otherwise support a means for receiving, while in an inactive mode from a base station, a wake-up signal for triggering a transition from the inactive mode to the active mode based on transmitting the sidelink message. The communications manager 920 may be configured as or otherwise support a means for communicating with the first UE once the second UE has re-entered the active mode based on receiving the wake-up signal while in the inactive mode.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption and reduced processing.

Figure 10:
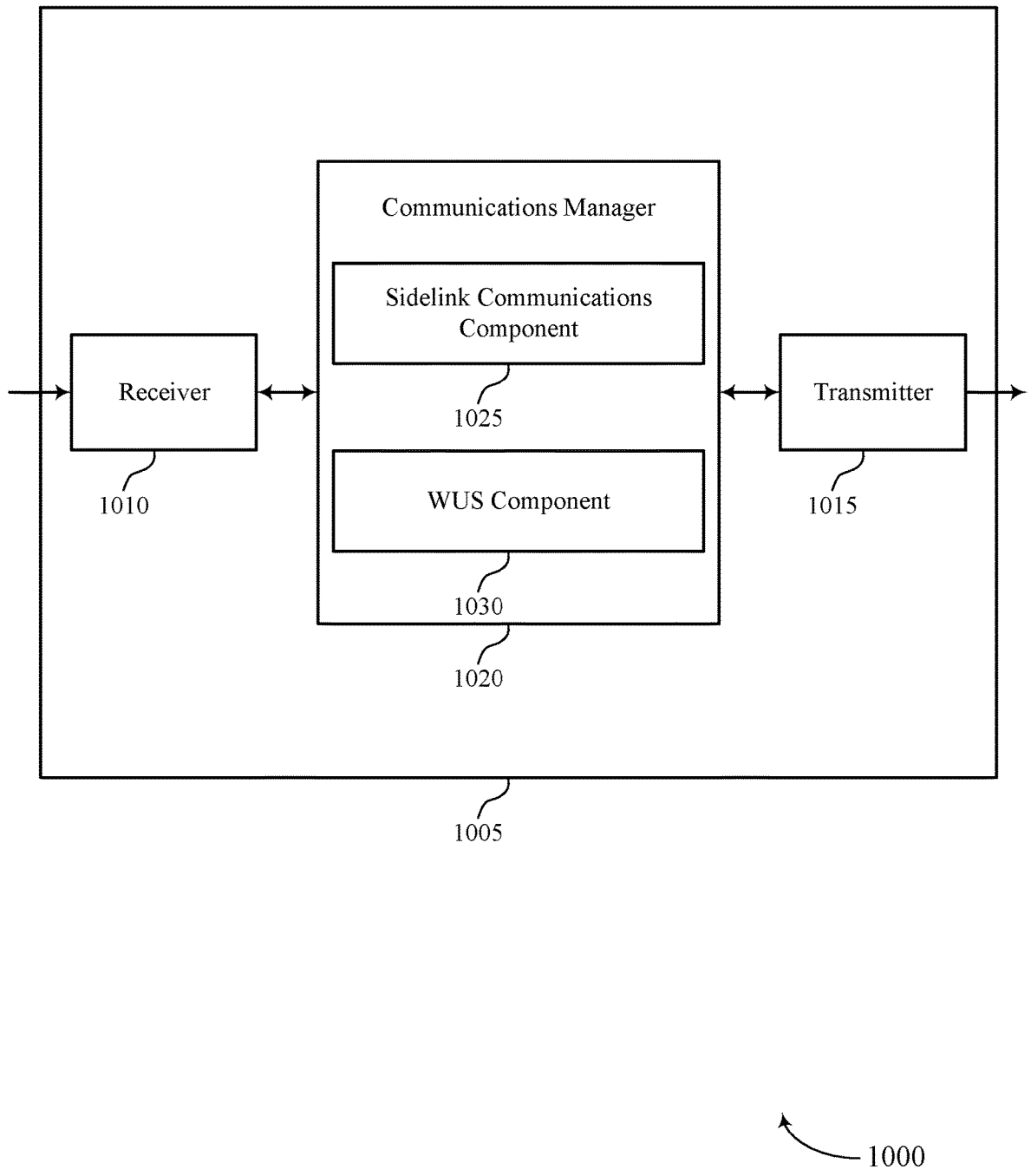

FIG. 10 shows a block diagram 1000 of a device 1005 that supports sidelink-induced Uu WUS in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to sidelink-induced Uu WUS). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to sidelink-induced Uu WUS). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of sidelink-induced Uu WUS as described herein. For example, the communications manager 1020 may include a sidelink communications component 1025 a WUS component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a first UE in accordance with examples as disclosed herein. The sidelink communications component 1025 may be configured as or otherwise support a means for receiving, from a second UE that is in an active mode, a sidelink message that includes an identification of the second UE. The sidelink communications component 1025 may be configured as or otherwise support a means for determining, subsequent to receiving the identification of the second UE, to further communicate via sidelink communications with the second UE while the second UE is in an idle mode. The WUS component 1030 may be configured as or otherwise support a means for transmitting an uplink message to a base station to trigger the base station to send a wake-up signal to the second UE, the uplink message including the identification of the second UE. The sidelink communications component 1025 may be configured as or otherwise support a means for communicating with the second UE once the second UE has re-entered the active mode subsequent to transmission of the uplink message.

Additionally, or alternatively, the communications manager 1020 may support wireless communication at a second UE in accordance with examples as disclosed herein. The sidelink communications component 1025 may be configured as or otherwise support a means for transmitting, while in an active mode to a first UE, a sidelink message that includes an identification of the second UE. The WUS component 1030 may be configured as or otherwise support a means for receiving, while in an inactive mode from a base station, a wake-up signal for triggering a transition from the inactive mode to the active mode based on transmitting the sidelink message. The sidelink communications component 1025 may be configured as or otherwise support a means for communicating with the first UE once the second UE has re-entered the active mode based on receiving the wake-up signal while in the inactive mode.

Figure 11:
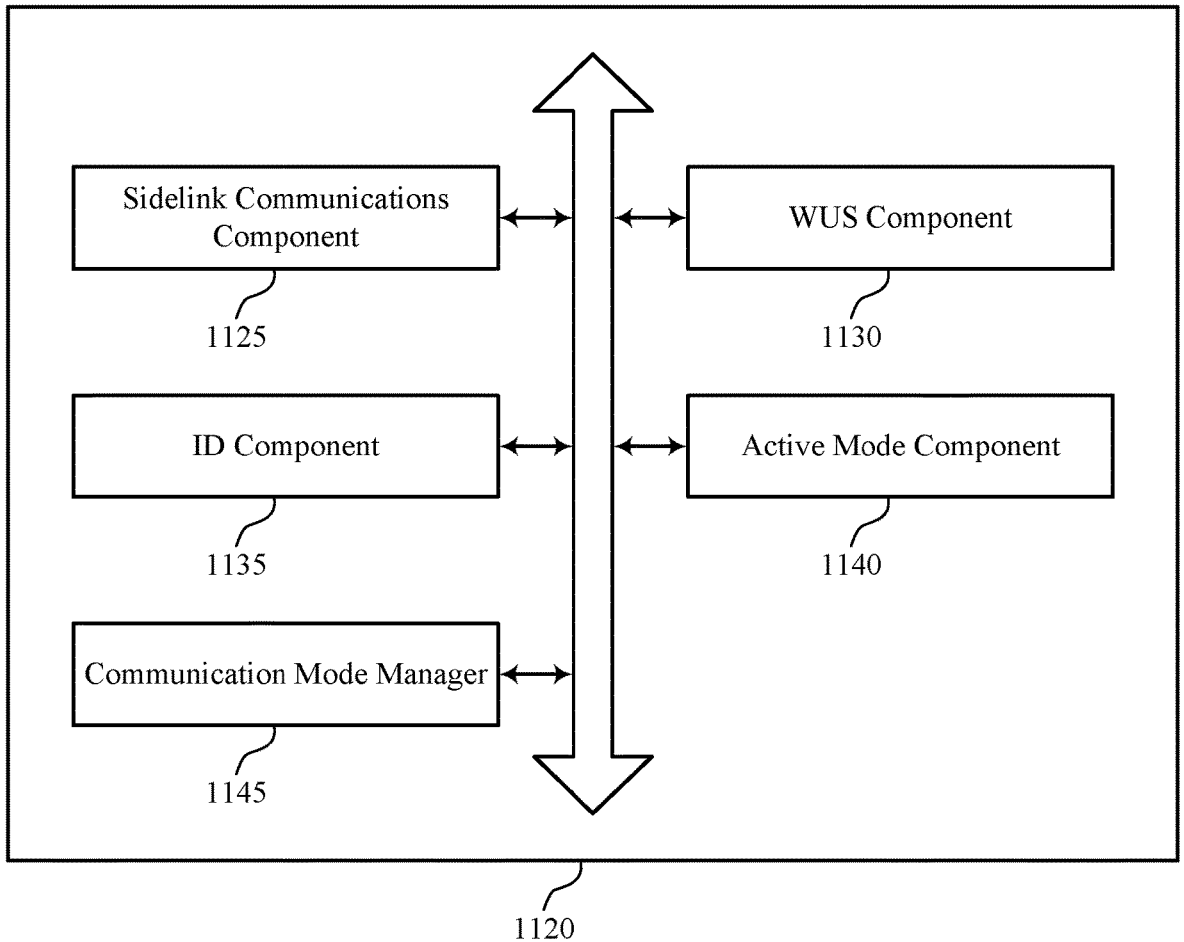
FIG. 11 shows a block diagram of a communications manager that supports sidelink-induced Uu WUS in accordance with aspects of the present disclosure.

FIG. 11 shows a block diagram 1100 of a communications manager 1120 that supports sidelink-induced Uu WUS in accordance with aspects of the present disclosure. The communications manager 1120 may be an example of aspects of a communications manager 920, a communications manager 1020, or both, as described herein. The communications manager 1120, or various components thereof, may be an example of means for performing various aspects of sidelink-induced Uu WUS as described herein. For example, the communications manager 1120 may include a sidelink communications component 1125, a WUS component 1130, an ID component 1135, an active mode component 1140, a communication mode manager 1145, or any combination thereof. Each of these components may communicate, directly or indirectly, with one another (e.g., via one or more buses).

The communications manager 1120 may support wireless communication at a first UE in accordance with examples as disclosed herein. The sidelink communications component 1125 may be configured as or otherwise support a means for receiving, from a second UE that is in an active mode, a sidelink message that includes an identification of the second UE. In some examples, the sidelink communications component 1125 may be configured as or otherwise support a means for determining, subsequent to receiving the identification of the second UE, to further communicate via sidelink communications with the second UE while the second UE is in an idle mode. The WUS component 1130 may be configured as or otherwise support a means for transmitting an uplink message to a base station to trigger the base station to send a wake-up signal to the second UE, the uplink message including the identification of the second UE. In some examples, the sidelink communications component 1125 may be configured as or otherwise support a means for communicating with the second UE once the second UE has re-entered the active mode subsequent to transmission of the uplink message.

In some examples, to support transmitting the uplink message, the ID component 1135 may be configured as or otherwise support a means for transmitting, in the uplink message, multiple identifications of multiple UEs with which the first UE is to communicate via sidelink communications, the second UE being one of the multiple UEs.

In some examples, to support transmitting the uplink message, the WUS component 1130 may be configured as or otherwise support a means for transmitting a scheduling request or a buffer status report as the uplink message.

In some examples, to support receiving the sidelink message, the sidelink communications component 1125 may be configured as or otherwise support a means for receiving an indication of a discontinuous reception cycle associated with communications at the second UE.

In some examples, the sidelink communications include groupcast or unicast communications.

In some examples, the identification of the second UE is one of a layer 1 identifier, a layer 2 identifier, a layer 3 identifier.

Additionally, or alternatively, the communications manager 1120 may support wireless communication at a second UE in accordance with examples as disclosed herein. In some examples, the sidelink communications component 1125 may be configured as or otherwise support a means for transmitting, while in an active mode to a first UE, a sidelink message that includes an identification of the second UE. In some examples, the WUS component 1130 may be configured as or otherwise support a means for receiving, while in an inactive mode from a base station, a wake-up signal for triggering a transition from the inactive mode to the active mode based on transmitting the sidelink message. In some examples, the sidelink communications component 1125 may be configured as or otherwise support a means for communicating with the first UE once the second UE has re-entered the active mode based on receiving the wake-up signal while in the inactive mode.

In some examples, to support receiving the wake-up signal triggering the transition from the inactive mode to the active mode, the WUS component 1130 may be configured as or otherwise support a means for receiving the wake-up signal in a first resource that is different from a second resource configured for receiving second wake-up signals for triggering the transition from the inactive mode to the active mode for base station-UE communications.

In some examples, to support receiving the wake-up signal triggering the transition from the inactive mode to the active mode, the WUS component 1130 may be configured as or otherwise support a means for receiving the wake-up signal as a first sequence of a set of preconfigured sequences, where the first sequence is different from a second sequence of the set of preconfigured sequences, the first sequence triggering the transition from the inactive mode to the active mode for the sidelink communications, and the second sequence triggering the transition from the inactive mode to the active mode for base station-UE communications.

In some examples, the active mode component 1140 may be configured as or otherwise support a means for identifying a selected active mode on duration during which the second UE is to remain in the active mode, where the selected active mode on duration is a longer of a first active mode on duration associated with a discontinuous reception cycle for base station-UE communications and a second active mode on duration associated with the sidelink communications. In some examples, the active mode component 1140 may be configured as or otherwise support a means for remaining in the active mode in accordance with the selected active mode on duration.

In some examples, the communication mode manager 1145 may be configured as or otherwise support a means for switching a transceiver mode based on receiving the wake-up signal, where the transceiver mode includes at least a sidelink communications mode.

In some examples, the communication mode manager 1145 may be configured as or otherwise support a means for activating a transceiver chain based on receiving the wake-up signal. In some examples, the communication mode manager 1145 may be configured as or otherwise support a means for maintaining the transceiver chain in an on state for a duration of the sidelink communication.

In some examples, the identification of the second UE is a layer 1 identifier, a layer 2 identifier, or a layer 3 identifier.

Figure 12:
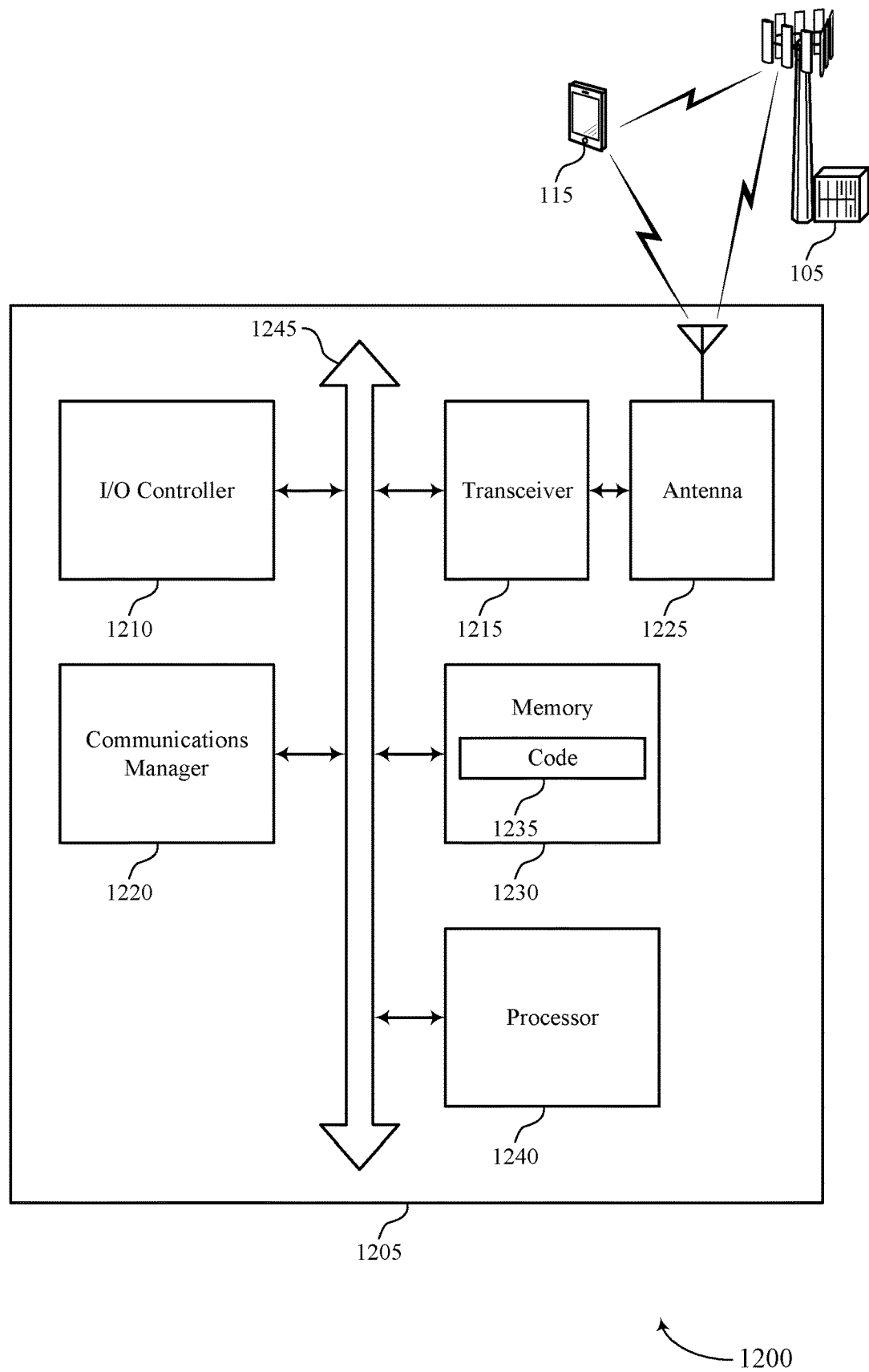
FIG. 12 shows a diagram of a system including a device that supports sidelink-induced Uu WUS in accordance with aspects of the present disclosure.

FIG. 12 shows a diagram of a system 1200 including a device 1205 that supports sidelink-induced Uu WUS in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting sidelink-induced Uu WUS). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a first UE in accordance with examples as disclosed herein. For example, the communications manager 1220 may be configured as or otherwise support a means for receiving, from a second UE that is in an active mode, a sidelink message that includes an identification of the second UE. The communications manager 1220 may be configured as or otherwise support a means for determining, subsequent to receiving the identification of the second UE, to further communicate via sidelink communications with the second UE while the second UE is in an idle mode. The communications manager 1220 may be configured as or otherwise support a means for transmitting an uplink message to a base station to trigger the base station to send a wake-up signal to the second UE, the uplink message including the identification of the second UE. The communications manager 1220 may be configured as or otherwise support a means for communicating with the second UE once the second UE has re-entered the active mode subsequent to transmission of the uplink message.

Additionally, or alternatively, the communications manager 1220 may support wireless communication at a second UE in accordance with examples as disclosed herein. For example, the communications manager 1220 may be configured as or otherwise support a means for transmitting, while in an active mode to a first UE, a sidelink message that includes an identification of the second UE. The communications manager 1220 may be configured as or otherwise support a means for receiving, while in an inactive mode from a base station, a wake-up signal for triggering a transition from the inactive mode to the active mode based on transmitting the sidelink message. The communications manager 1220 may be configured as or otherwise support a means for communicating with the first UE once the second UE has re-entered the active mode based on receiving the wake-up signal while in the inactive mode.

By including or configuring the communications manager 1220 in accordance with examples as described herein, the device 1205 may support techniques for reduced power consumption, improved user experience related to reduced processing, more efficient utilization of communication resources, improved coordination between devices, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of sidelink-induced Uu WUS as described herein, or the processor 1240 and the memory 1230 may be otherwise configured to perform or support such operations.

Figure 13:
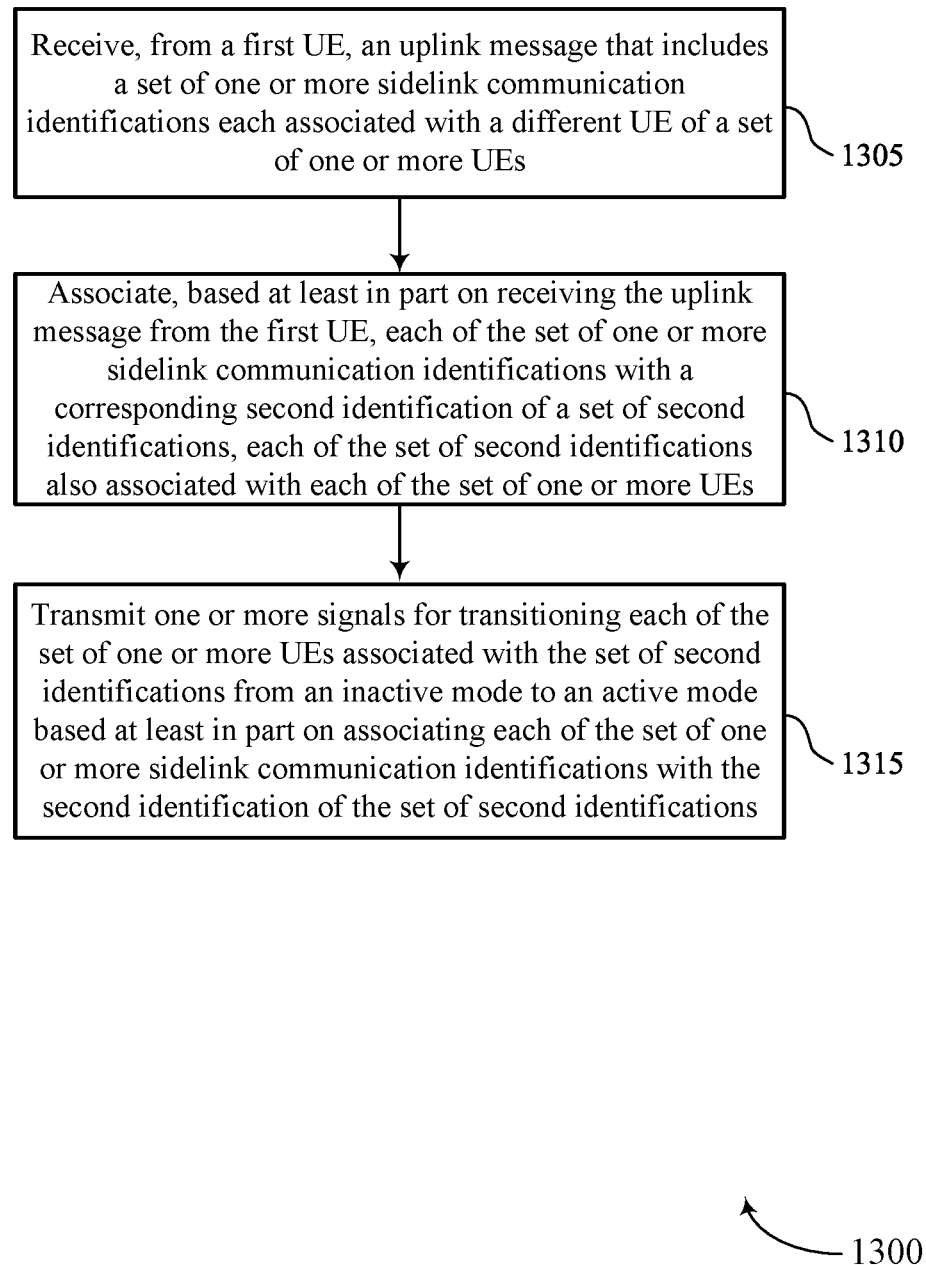
FIGS. 13 through 20 show flowcharts illustrating methods that support sidelink-induced Uu WUS in accordance with aspects of the present disclosure.

FIG. 13 shows a flowchart illustrating a method 1300 that supports sidelink-induced Uu WUS in accordance with aspects of the present disclosure. The operations of the method 1300 may be implemented by a base station or its components as described herein. For example, the operations of the method 1300 may be performed by a base station 105 as described with reference to FIGS. 1 through 8. In some examples, a base station may execute a set of instructions to control the functional elements of the base station to perform the described functions. Additionally, or alternatively, the base station may perform aspects of the described functions using special-purpose hardware.

At 1305, the method may include receiving, from a first UE, an uplink message that includes a set of one or more sidelink communication identifications each associated with a different UE of a set of one or more UEs. The operations of 1305 may be performed in accordance with examples as disclosed herein. In some examples, aspects of the operations of 1305 may be performed by an UL indication component 725 as described with reference to FIG. 7.

At 1310, the method may include associating, based on receiving the uplink message from the first UE, each of the set of one or more sidelink communication identifications with a corresponding second identification of a set of second identifications, each of the set of second identifications also associated with each of the set of one or more UEs. The operations of 1310 may be performed in accordance with examples as disclosed herein. In some examples, aspects of the operations of 1310 may be performed by an ID component 730 as described with reference to FIG. 7.

At 1315, the method may include transmitting one or more signals for transitioning each of the set of one or more UEs associated with the set of second identifications from an inactive mode to an active mode based on associating each of the set of one or more sidelink communication identifications with the second identification of the set of second identifications. The operations of 1315 may be performed in accordance with examples as disclosed herein. In some examples, aspects of the operations of 1315 may be performed by a WUS transmitter 735 as described with reference to FIG. 7.

Figure 14:
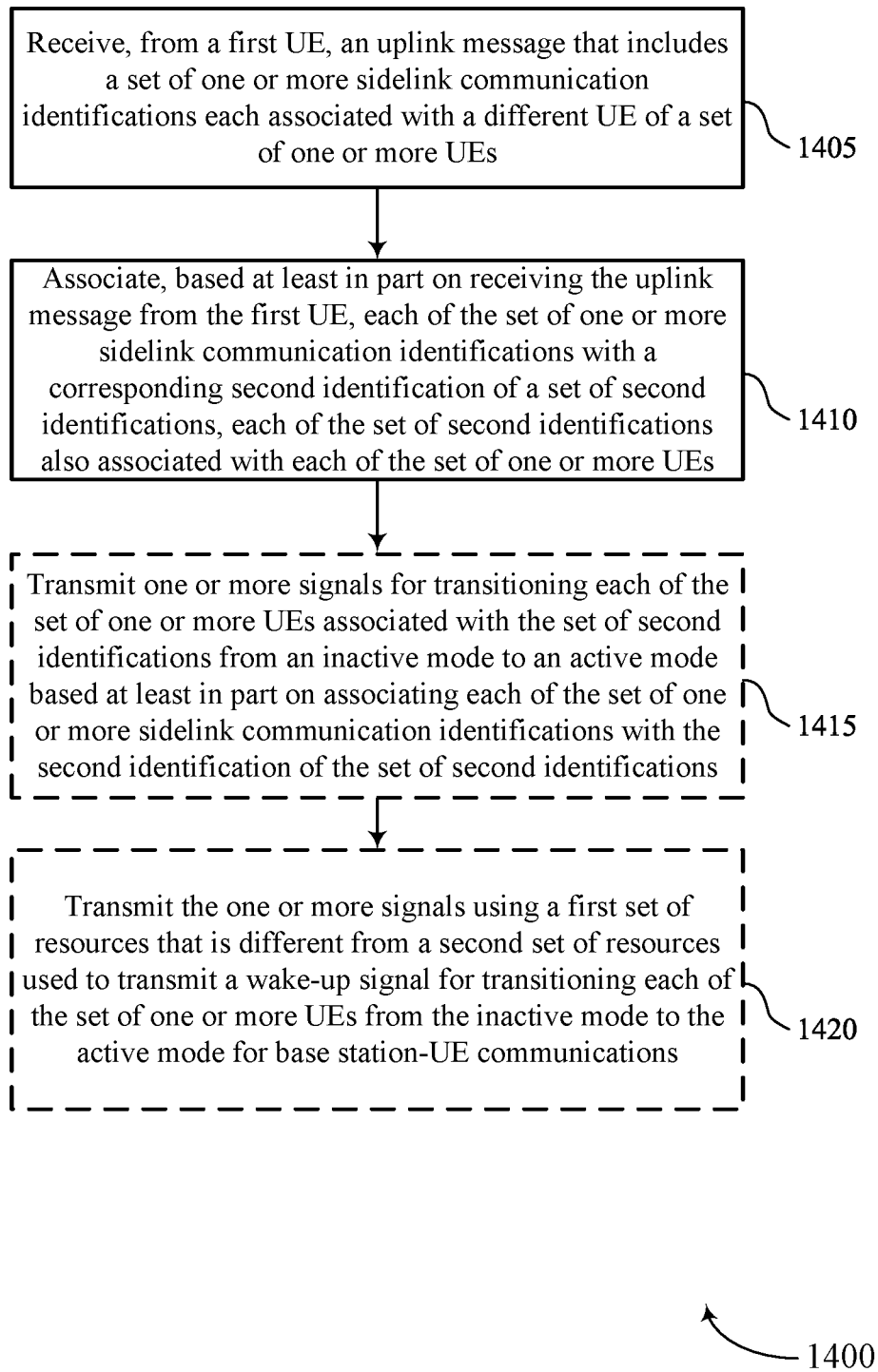

FIG. 14 shows a flowchart illustrating a method 1400 that supports sidelink-induced Uu WUS in accordance with aspects of the present disclosure. The operations of the method 1400 may be implemented by a base station or its components as described herein. For example, the operations of the method 1400 may be performed by a base station 105 as described with reference to FIGS. 1 through 8. In some examples, a base station may execute a set of instructions to control the functional elements of the base station to perform the described functions. Additionally, or alternatively, the base station may perform aspects of the described functions using special-purpose hardware.

At 1405, the method may include receiving, from a first UE, an uplink message that includes a set of one or more sidelink communication identifications each associated with a different UE of a set of one or more UEs. The operations of 1405 may be performed in accordance with examples as disclosed herein. In some examples, aspects of the operations of 1405 may be performed by an UL indication component 725 as described with reference to FIG. 7.

At 1410, the method may include associating, based on receiving the uplink message from the first UE, each of the set of one or more sidelink communication identifications with a corresponding second identification of a set of second identifications, each of the set of second identifications also associated with each of the set of one or more UEs. The operations of 1410 may be performed in accordance with examples as disclosed herein. In some examples, aspects of the operations of 1410 may be performed by an ID component 730 as described with reference to FIG. 7.

At 1415, the method may include transmitting one or more signals for transitioning each of the set of one or more UEs associated with the set of second identifications from an inactive mode to an active mode based on associating each of the set of one or more sidelink communication identifications with the second identification of the set of second identifications. The operations of 1415 may be performed in accordance with examples as disclosed herein. In some examples, aspects of the operations of 1415 may be performed by a WUS transmitter 735 as described with reference to FIG. 7.

At 1420, the method may include transmitting the one or more signals using a first set of resources that is different from a second set of resources used to transmit a wake-up signal for transitioning each of the set of one or more UEs from the inactive mode to the active mode for base station-UE communications. The operations of 1420 may be performed in accordance with examples as disclosed herein. In some examples, aspects of the operations of 1420 may be performed by a WUS transmitter 735 as described with reference to FIG. 7.

Figure 15:
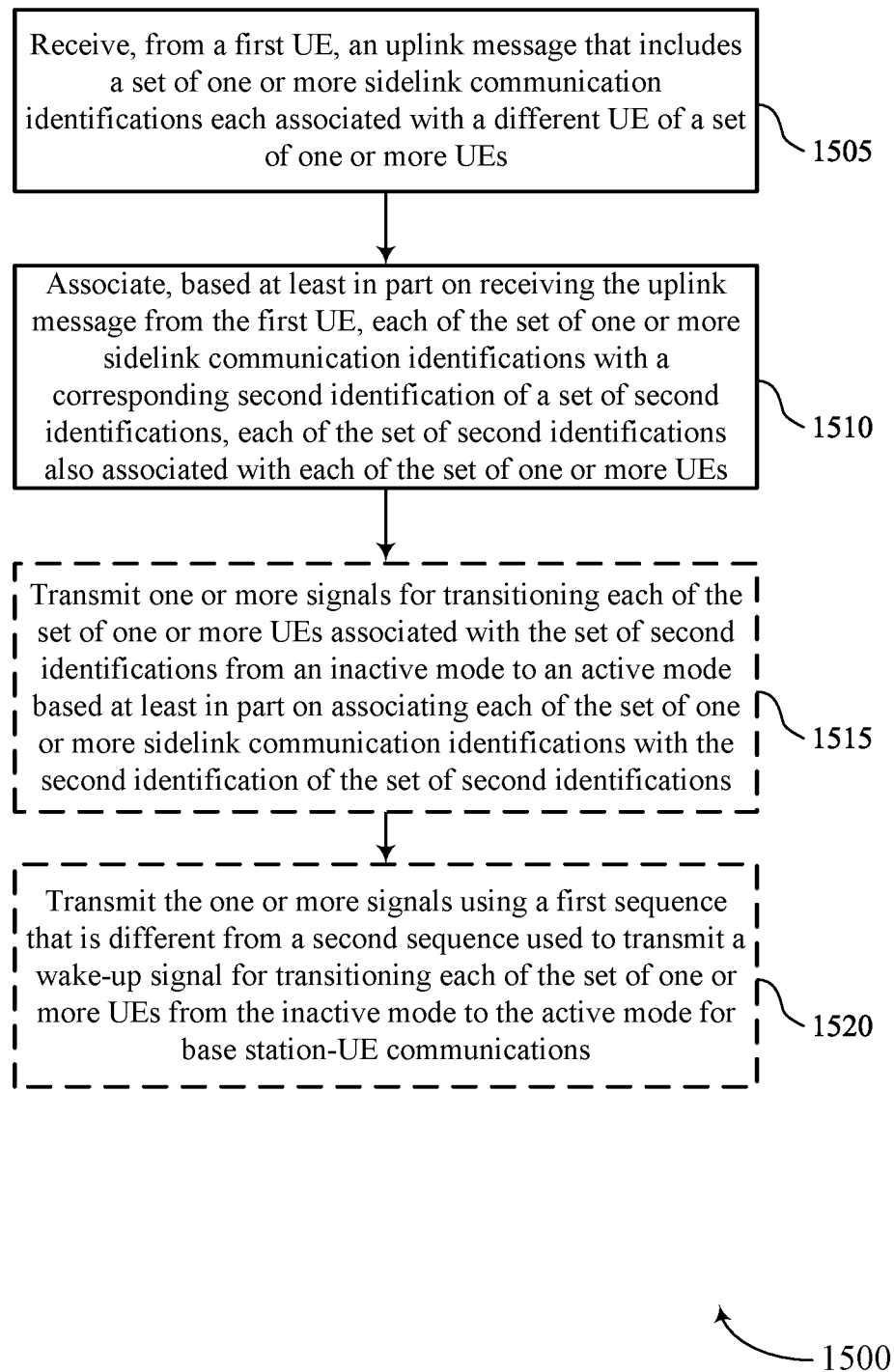

FIG. 15 shows a flowchart illustrating a method 1500 that supports sidelink-induced Uu WUS in accordance with aspects of the present disclosure. The operations of the method 1500 may be implemented by a base station or its components as described herein. For example, the operations of the method 1500 may be performed by a base station 105 as described with reference to FIGS. 1 through 8. In some examples, a base station may execute a set of instructions to control the functional elements of the base station to perform the described functions. Additionally, or alternatively, the base station may perform aspects of the described functions using special-purpose hardware.

At 1505, the method may include receiving, from a first UE, an uplink message that includes a set of one or more sidelink communication identifications each associated with a different UE of a set of one or more UEs. The operations of 1505 may be performed in accordance with examples as disclosed herein. In some examples, aspects of the operations of 1505 may be performed by an UL indication component 725 as described with reference to FIG. 7.

At 1510, the method may include associating, based on receiving the uplink message from the first UE, each of the set of one or more sidelink communication identifications with a corresponding second identification of a set of second identifications, each of the set of second identifications also associated with each of the set of one or more UEs. The operations of 1510 may be performed in accordance with examples as disclosed herein. In some examples, aspects of the operations of 1510 may be performed by an ID component 730 as described with reference to FIG. 7.

At 1515, the method may include transmitting one or more signals for transitioning each of the set of one or more UEs associated with the set of second identifications from an inactive mode to an active mode based on associating each of the set of one or more sidelink communication identifications with the second identification of the set of second identifications. The operations of 1515 may be performed in accordance with examples as disclosed herein. In some examples, aspects of the operations of 1515 may be performed by a WUS transmitter 735 as described with reference to FIG. 7.

At 1520, the method may include transmitting the one or more signals using a first sequence that is different from a second sequence used to transmit a wake-up signal for transitioning each of the set of one or more UEs from the inactive mode to the active mode for base station-UE communications. The operations of 1520 may be performed in accordance with examples as disclosed herein. In some examples, aspects of the operations of 1520 may be performed by a WUS transmitter 735 as described with reference to FIG. 7.

Figure 16:
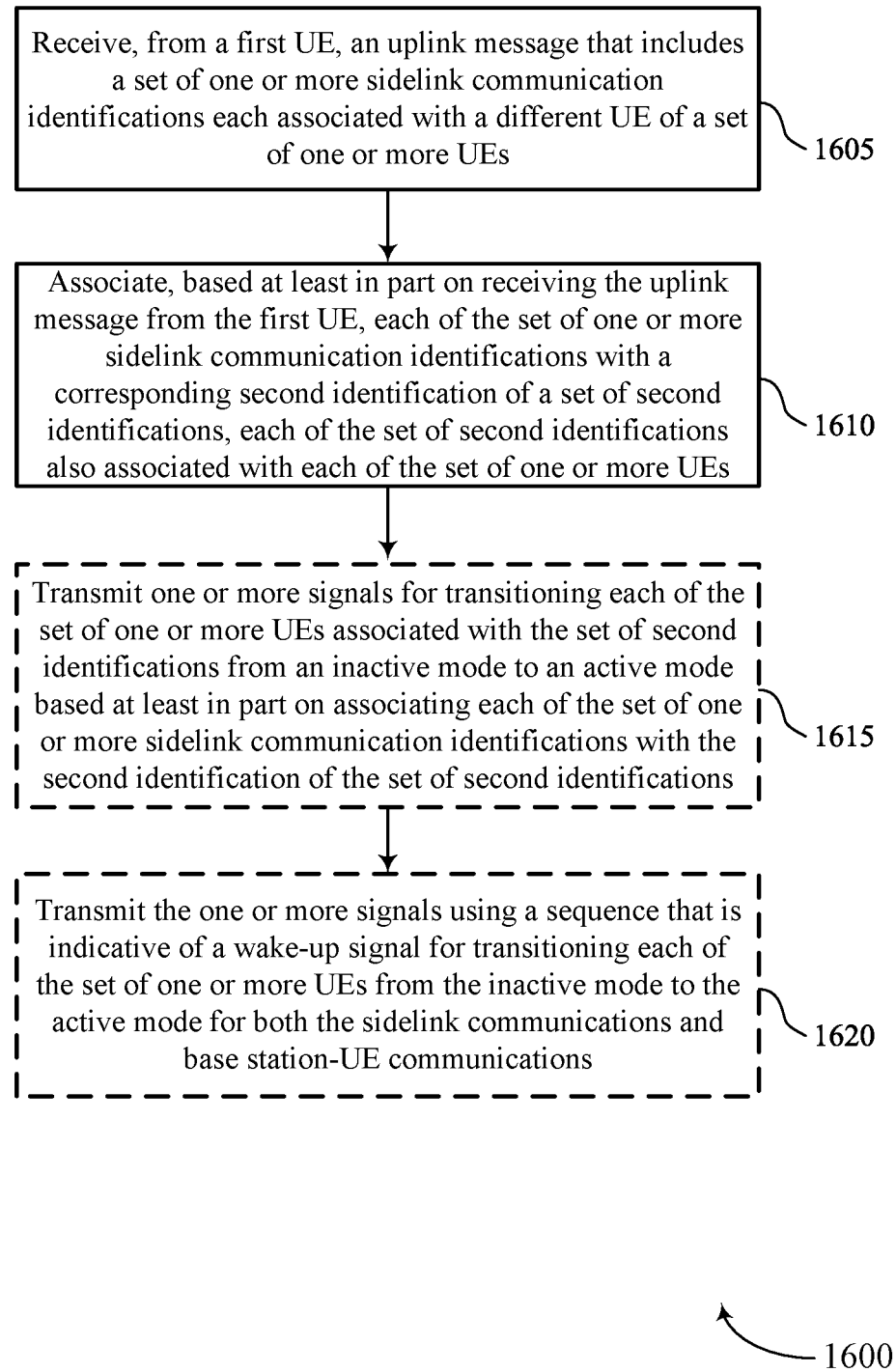

FIG. 16 shows a flowchart illustrating a method 1600 that supports sidelink-induced Uu WUS in accordance with aspects of the present disclosure. The operations of the method 1600 may be implemented by a base station or its components as described herein. For example, the operations of the method 1600 may be performed by a base station 105 as described with reference to FIGS. 1 through 8. In some examples, a base station may execute a set of instructions to control the functional elements of the base station to perform the described functions. Additionally, or alternatively, the base station may perform aspects of the described functions using special-purpose hardware.

At 1605, the method may include receiving, from a first UE, an uplink message that includes a set of one or more sidelink communication identifications each associated with a different UE of a set of one or more UEs. The operations of 1605 may be performed in accordance with examples as disclosed herein. In some examples, aspects of the operations of 1605 may be performed by an UL indication component 725 as described with reference to FIG. 7.

At 1610, the method may include associating, based on receiving the uplink message from the first UE, each of the set of one or more sidelink communication identifications with a corresponding second identification of a set of second identifications, each of the set of second identifications also associated with each of the set of one or more UEs. The operations of 1610 may be performed in accordance with examples as disclosed herein. In some examples, aspects of the operations of 1610 may be performed by an ID component 730 as described with reference to FIG. 7.

At 1615, the method may include transmitting one or more signals for transitioning each of the set of one or more UEs associated with the set of second identifications from an inactive mode to an active mode based on associating each of the set of one or more sidelink communication identifications with the second identification of the set of second identifications. The operations of 1615 may be performed in accordance with examples as disclosed herein. In some examples, aspects of the operations of 1615 may be performed by a WUS transmitter 735 as described with reference to FIG. 7.

At 1620, the method may include transmitting the one or more signals using a sequence that is indicative of a wake-up signal for transitioning each of the set of one or more UEs from the inactive mode to the active mode for both the sidelink communications and base station-UE communications. The operations of 1620 may be performed in accordance with examples as disclosed herein. In some examples, aspects of the operations of 1620 may be performed by a WUS transmitter 735 as described with reference to FIG. 7.

Figure 17:
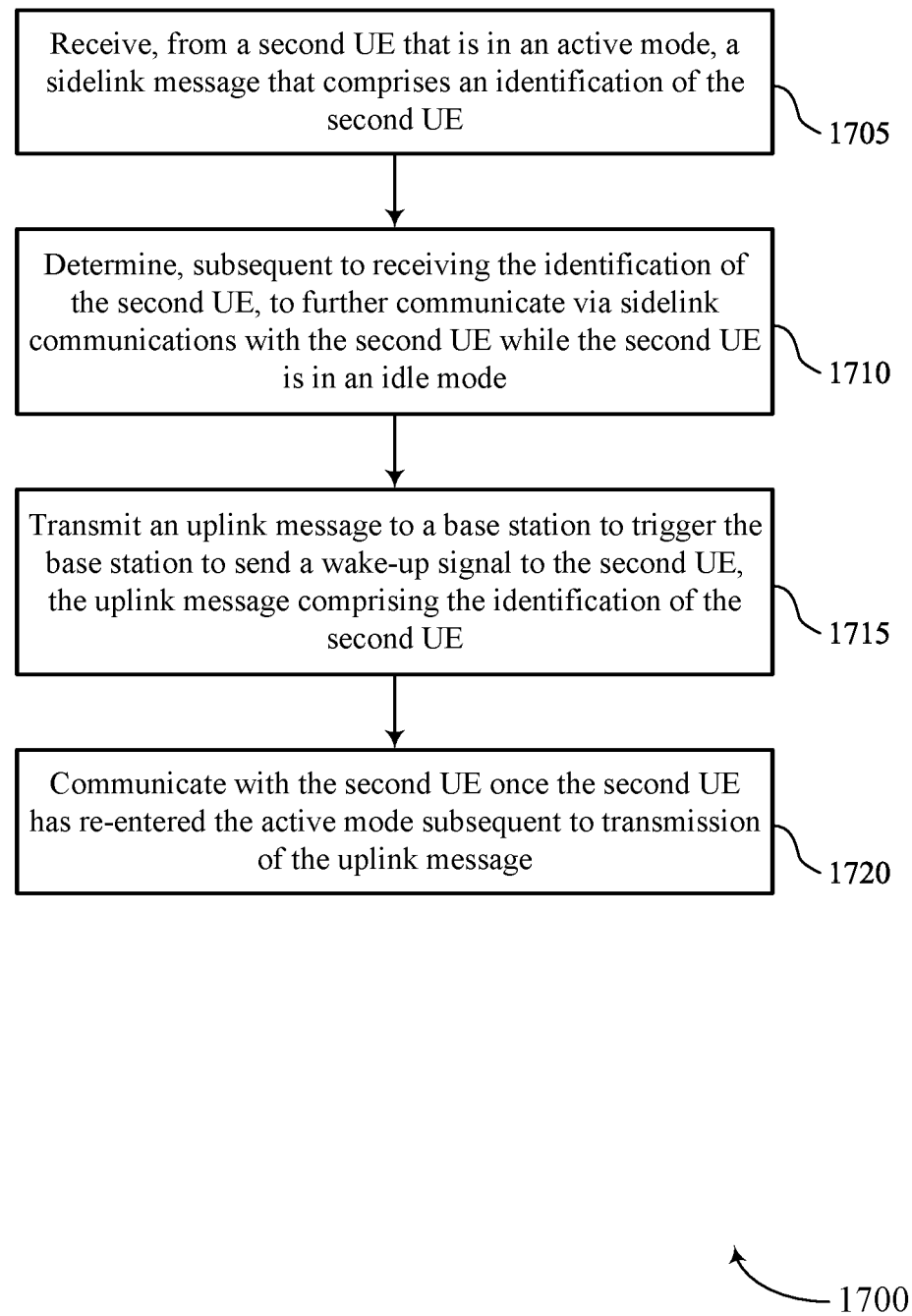

FIG. 17 shows a flowchart illustrating a method 1700 that supports sidelink-induced Uu WUS in accordance with aspects of the present disclosure. The operations of the method 1700 may be implemented by a UE or its components as described herein. For example, the operations of the method 1700 may be performed by a UE 115 as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1705, the method may include receiving, from a second UE that is in an active mode, a sidelink message that includes an identification of the second UE. The operations of 1705 may be performed in accordance with examples as disclosed herein. In some examples, aspects of the operations of 1705 may be performed by a sidelink communications component 1125 as described with reference to FIG. 11.

At 1710, the method may include determining, subsequent to receiving the identification of the second UE, to further communicate via sidelink communications with the second UE while the second UE is in an idle mode. The operations of 1710 may be performed in accordance with examples as disclosed herein. In some examples, aspects of the operations of 1710 may be performed by a sidelink communications component 1125 as described with reference to FIG. 11.

At 1715, the method may include transmitting an uplink message to a base station to trigger the base station to send a wake-up signal to the second UE, the uplink message including the identification of the second UE. The operations of 1715 may be performed in accordance with examples as disclosed herein. In some examples, aspects of the operations of 1715 may be performed by a WUS component 1130 as described with reference to FIG. 11.

At 1720, the method may include communicating with the second UE once the second UE has re-entered the active mode subsequent to transmission of the uplink message. The operations of 1720 may be performed in accordance with examples as disclosed herein. In some examples, aspects of the operations of 1720 may be performed by a sidelink communications component 1125 as described with reference to FIG. 11.

Figure 18:
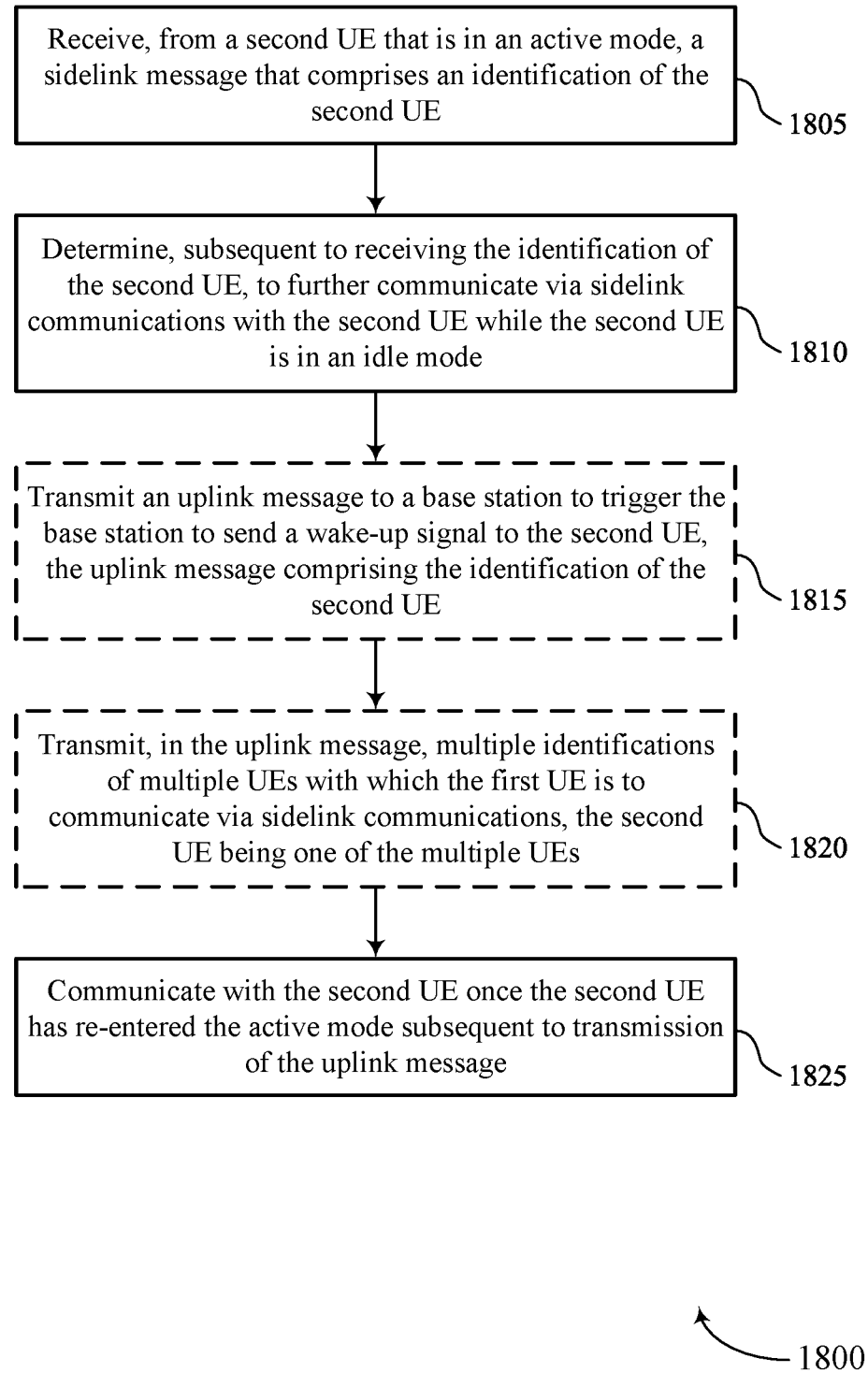

FIG. 18 shows a flowchart illustrating a method 1800 that supports sidelink-induced Uu WUS in accordance with aspects of the present disclosure. The operations of the method 1800 may be implemented by a UE or its components as described herein. For example, the operations of the method 1800 may be performed by a UE 115 as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1805, the method may include receiving, from a second UE that is in an active mode, a sidelink message that includes an identification of the second UE. The operations of 1805 may be performed in accordance with examples as disclosed herein. In some examples, aspects of the operations of 1805 may be performed by a sidelink communications component 1125 as described with reference to FIG. 11.

At 1810, the method may include determining, subsequent to receiving the identification of the second UE, to further communicate via sidelink communications with the second UE while the second UE is in an idle mode. The operations of 1810 may be performed in accordance with examples as disclosed herein. In some examples, aspects of the operations of 1810 may be performed by a sidelink communications component 1125 as described with reference to FIG. 11.

At 1815, the method may include transmitting an uplink message to a base station to trigger the base station to send a wake-up signal to the second UE, the uplink message including the identification of the second UE. The operations of 1815 may be performed in accordance with examples as disclosed herein. In some examples, aspects of the operations of 1815 may be performed by a WUS component 1130 as described with reference to FIG. 11.

At 1820, the method may include transmitting, in the uplink message, multiple identifications of multiple UEs with which the first UE is to communicate via sidelink communications, the second UE being one of the multiple UEs. The operations of 1820 may be performed in accordance with examples as disclosed herein. In some examples, aspects of the operations of 1820 may be performed by an ID component 1135 as described with reference to FIG. 11.

At 1825, the method may include communicating with the second UE once the second UE has re-entered the active mode subsequent to transmission of the uplink message. The operations of 1825 may be performed in accordance with examples as disclosed herein. In some examples, aspects of the operations of 1825 may be performed by a sidelink communications component 1125 as described with reference to FIG. 11.

Figure 19:
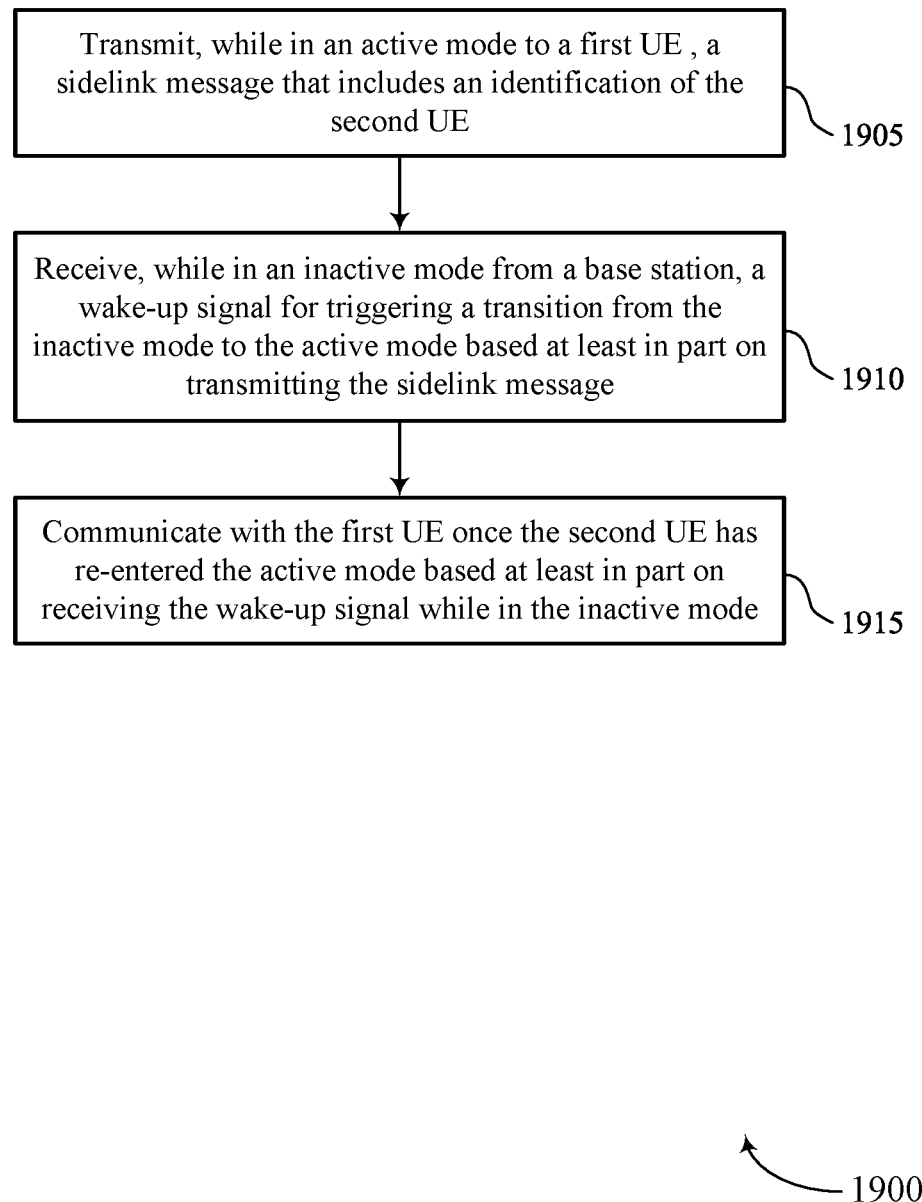

FIG. 19 shows a flowchart illustrating a method 1900 that supports sidelink-induced Uu WUS in accordance with aspects of the present disclosure. The operations of the method 1900 may be implemented by a UE or its components as described herein. For example, the operations of the method 1900 may be performed by a UE 115 as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1905, the method may include transmitting, while in an active mode to a first UE, a sidelink message that includes an identification of the second UE. The operations of 1905 may be performed in accordance with examples as disclosed herein. In some examples, aspects of the operations of 1905 may be performed by a sidelink communications component 1125 as described with reference to FIG. 11.

At 1910, the method may include receiving, while in an inactive mode from a base station, a wake-up signal for triggering a transition from the inactive mode to the active mode based on transmitting the sidelink message. The operations of 1910 may be performed in accordance with examples as disclosed herein. In some examples, aspects of the operations of 1910 may be performed by a WUS component 1130 as described with reference to FIG. 11.

At 1915, the method may include communicating with the first UE once the second UE has re-entered the active mode based on receiving the wake-up signal while in the inactive mode. The operations of 1915 may be performed in accordance with examples as disclosed herein. In some examples, aspects of the operations of 1915 may be performed by a sidelink communications component 1125 as described with reference to FIG. 11.

Figure 20:
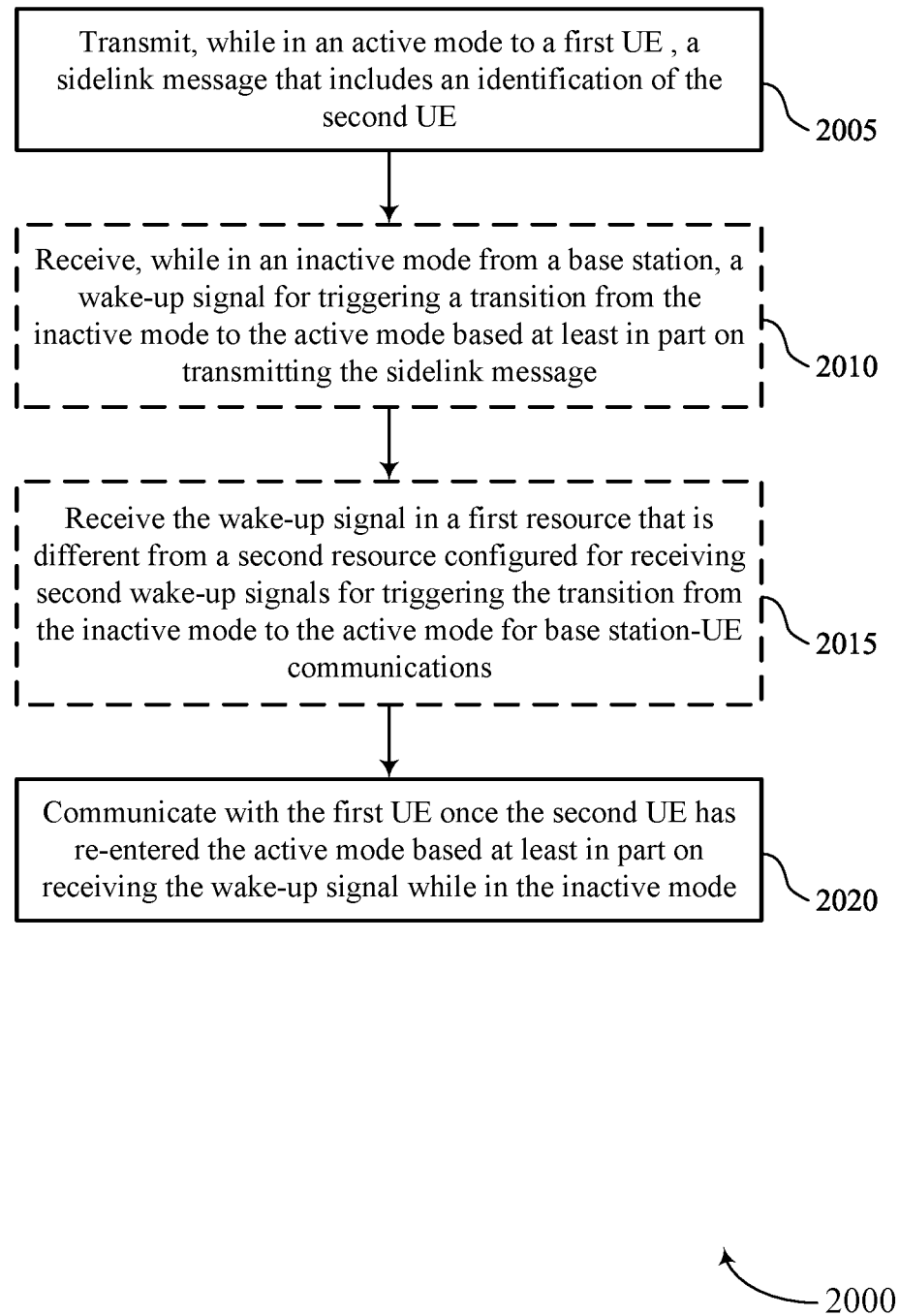

FIG. 20 shows a flowchart illustrating a method 2000 that supports sidelink-induced Uu WUS in accordance with aspects of the present disclosure. The operations of the method 2000 may be implemented by a UE or its components as described herein. For example, the operations of the method 2000 may be performed by a UE 115 as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 2005, the method may include transmitting, while in an active mode to a first UE, a sidelink message that includes an identification of the second UE. The operations of 2005 may be performed in accordance with examples as disclosed herein. In some examples, aspects of the operations of 2005 may be performed by a sidelink communications component 1125 as described with reference to FIG. 11.

At 2010, the method may include receiving, while in an inactive mode from a base station, a wake-up signal for triggering a transition from the inactive mode to the active mode based on transmitting the sidelink message. The operations of 2010 may be performed in accordance with examples as disclosed herein. In some examples, aspects of the operations of 2010 may be performed by a WUS component 1130 as described with reference to FIG. 11.

At 2015, the method may include receiving the wake-up signal in a first resource that is different from a second resource configured for receiving second wake-up signals for triggering the transition from the inactive mode to the active mode for base station-UE communications. The operations of 2015 may be performed in accordance with examples as disclosed herein. In some examples, aspects of the operations of 2015 may be performed by a WUS component 1130 as described with reference to FIG. 11.

At 2020, the method may include communicating with the first UE once the second UE has re-entered the active mode based on receiving the wake-up signal while in the inactive mode. The operations of 2020 may be performed in accordance with examples as disclosed herein. In some examples, aspects of the operations of 2020 may be performed by a sidelink communications component 1125 as described with reference to FIG. 11.

The following provides an overview of aspects of the present disclosure:

Aspect 1: A method for wireless communication at a base station, comprising: receiving, from a first UE, an uplink message that includes a set of one or more sidelink communication identifications each associated with a different UE of a set of one or more UEs; associating, based on receiving the uplink message from the first UE, each of the set of one or more sidelink communication identifications with a corresponding second identification of a set of second identifications, each of the set of second identifications also associated with each of the set of one or more UEs; and transmitting one or more signals for transitioning each of the set of one or more UEs associated with the set of second identifications from an inactive mode to an active mode based at least in part on associating each of the set of one or more sidelink communication identifications with the second identification of the set of second identifications.

Aspect 2: The method of aspect 1, wherein transmitting the one or more signals further comprises: transmitting the one or more signals using a first set of resources that is different from a second set of resources used to transmit a wake-up signal for transitioning each of the set of one or more UEs from the inactive mode to the active mode for base station-UE communications.

Aspect 3: The method of any of aspects 1 through 2, wherein transmitting the one or more signals comprises: transmitting the one or more signals using a first sequence that is different from a second sequence used to transmit a wake-up signal for transitioning each of the set of one or more UEs from the inactive mode to the active mode for base station-UE communications.

Aspect 4: The method of any of aspects 1 through 3, wherein transmitting the one or more signals comprises: transmitting the one or more signals using a sequence that is indicative of a wake-up signal for transitioning each of the set of one or more UEs from the inactive mode to the active mode for both the sidelink communications and base station-UE communications.

Aspect 5: The method of any of aspects 1 through 4, further comprising: transmitting radio resource control signaling in order to configure the set of one or more UEs with resources or sequences to be used in the transmitting of the one or more signals, wherein the resources or sequences are different from wake-up resources or sequences used for base station-UE communications.

Aspect 6: The method of any of aspects 1 through 5, wherein transmitting the one or more signals comprises: transmitting the one or more signals as wake-up signals that include first payloads that indicate that the wake-up signals are for transitioning each of the set of one or more UEs from the inactive mode to the active mode for the sidelink communications during a first duration of time, wherein the first payloads are different from second payloads that indicate that the wake-up signals are for transitioning each of the set of one or more UEs for base station-UE communications or for both the sidelink communications and the base station-UE communications during a second duration of time.

Aspect 7: The method of any of aspects 1 through 6, wherein transmitting the one or more signals comprises: transmitting the one or more signals as wake-up signals that include an indication of a first pool of resources for the set of one or more UEs to monitor for sidelink communications after transitioning from the inactive mode to the active mode, wherein the first pool of resources is different from a second pool of resources configured for base station-UE communications.

Aspect 8: The method of any of aspects 1 through 7, wherein transmitting the one or more signals comprises: transmitting a group wake-up signal to each of the set of one or more UEs.

Aspect 9: The method of any of aspects 1 through 8, further comprising: determining that at least one UE of the set of one or more UEs is connected to a second base station; and transmitting, to the second base station, a message that includes a sidelink communication identification of the at least one UE to trigger the second base station to transmit a wake-up signal to the at least one UE.

Aspect 10: The method of aspect 9, wherein the message is transmitted via an X2 interface.

Aspect 11: The method of any of aspects 1 through 10, wherein receiving the uplink message further comprises: receiving either a scheduling request or a buffer status report as the uplink message.

Aspect 12: The method of any of aspects 1 through 11, wherein the one or more sidelink communication identifications comprise layer 1 identifiers, layer 2 identifiers, or layer 3 identifiers and the set of second identifications comprises a set of Uu interface identifiers.

Aspect 13: The method of aspect 12, wherein the set of Uu interface identifiers comprises a set of cell radio network temporary identifiers.

Aspect 14: A method for wireless communication at a first UE, comprising: receiving, from a second UE that is in an active mode, a sidelink message that comprises an identification of the second UE; determining, subsequent to receiving the identification of the second UE, to further communicate via sidelink communications with the second UE while the second UE is in an idle mode; transmitting an uplink message to a base station to trigger the base station to send a wake-up signal to the second UE, the uplink message comprising the identification of the second UE; and communicating with the second UE once the second UE has re-entered the active mode subsequent to transmission of the uplink message.

Aspect 15: The method of aspect 14, wherein transmitting the uplink message further comprises: transmitting, in the uplink message, multiple identifications of multiple UEs with which the first UE is to communicate via sidelink communications, the second UE being one of the multiple UEs.

Aspect 16: The method of any of aspects 14 through 15, wherein transmitting the uplink message further comprises: transmitting a scheduling request or a buffer status report as the uplink message.

Aspect 17: The method of any of aspects 14 through 16, wherein receiving the sidelink message further comprises: receiving an indication of a discontinuous reception cycle associated with communications at the second UE.

Aspect 18: The method of any of aspects 14 through 17, wherein the sidelink communications comprise groupcast or unicast communications.

Aspect 19: The method of any of aspects 14 through 18, wherein the identification of the second UE is one of a layer 1 identifier, a layer 2 identifier, a layer 3 identifier.

Aspect 20: A method for wireless communication at a second UE, comprising: transmitting, while in an active mode to a first UE, a sidelink message that includes an identification of the second UE; receiving, while in an inactive mode from a base station, a wake-up signal for triggering a transition from the inactive mode to the active mode based at least in part on transmitting the sidelink message; and communicating with the first UE once the second UE has re-entered the active mode based at least in part on receiving the wake-up signal while in the inactive mode.

Aspect 21: The method of aspect 20, wherein receiving the wake-up signal triggering the transition from the inactive mode to the active mode further comprises: receiving the wake-up signal in a first resource that is different from a second resource configured for receiving second wake-up signals for triggering the transition from the inactive mode to the active mode for base station-UE communications.

Aspect 22: The method of any of aspects 20 through 21, wherein receiving the wake-up signal triggering the transition from the inactive mode to the active mode further comprises: receiving the wake-up signal as a first sequence of a set of preconfigured sequences, wherein the first sequence is different from a second sequence of the set of preconfigured sequences, the first sequence triggering the transition from the inactive mode to the active mode for the sidelink communications, and the second sequence triggering the transition from the inactive mode to the active mode for base station-UE communications.

Aspect 23: The method of any of aspects 20 through 22, further comprising: identifying a selected active mode on duration during which the second UE is to remain in the active mode, wherein the selected active mode on duration is a longer of a first active mode on duration associated with a discontinuous reception cycle for base station-UE communications and a second active mode on duration associated with the sidelink communications; and remaining in the active mode in accordance with the selected active mode on duration.

Aspect 24: The method of any of aspects 20 through 23, further comprising: switching a transceiver mode based at least in part on receiving the wake-up signal, wherein the transceiver mode includes at least a sidelink communications mode.

Aspect 25: The method of any of aspects 20 through 24, further comprising: activating a transceiver chain based at least in part on receiving the wake-up signal; and maintaining the transceiver chain in an on state for a duration of the sidelink communication.

Aspect 26: The method of any of aspects 20 through 25, wherein the identification of the second UE is a layer 1 identifier, a layer 2 identifier, or a layer 3 identifier.

Aspect 27: An apparatus for wireless communication at a base station, comprising a processor; memory coupled with the processor; and instructions stored in the memory and executable by the processor to cause the apparatus to perform a method of any of aspects 1 through 13.

Aspect 28: An apparatus for wireless communication at a base station, comprising at least one means for performing a method of any of aspects 1 through 13.

Aspect 29: A non-transitory computer-readable medium storing code for wireless communication at a base station, the code comprising instructions executable by a processor to perform a method of any of aspects 1 through 13.

Aspect 30: An apparatus for wireless communication at a first UE, comprising a processor; memory coupled with the processor; and instructions stored in the memory and executable by the processor to cause the apparatus to perform a method of any of aspects 14 through 19.

Aspect 31: An apparatus for wireless communication at a first UE, comprising at least one means for performing a method of any of aspects 14 through 19.

Aspect 32: A non-transitory computer-readable medium storing code for wireless communication at a first UE, the code comprising instructions executable by a processor to perform a method of any of aspects 14 through 19.

Aspect 33: An apparatus for wireless communication at a second UE, comprising a processor; memory coupled with the processor; and instructions stored in the memory and executable by the processor to cause the apparatus to perform a method of any of aspects 20 through 26.

Aspect 34: An apparatus for wireless communication at a second UE, comprising at least one means for performing a method of any of aspects 20 through 26.

Aspect 35: A non-transitory computer-readable medium storing code for wireless communication at a second UE, the code comprising instructions executable by a processor to perform a method of any of aspects 20 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a base station, comprising:
    at least one processor;
    at least one memory coupled with the at least one processor, wherein the at least one processor is configured to:
        receive, from a first user equipment (UE), an uplink message that includes a set of one or more sidelink communication identifications each associated with a different UE of a set of one or more UEs;
        associate, based at least in part on receiving the uplink message from the first UE, each of the set of one or more sidelink communication identifications with a second identification of a set of second identifications, each of the set of second identifications also associated with each of the set of one or more UEs; and
        transmit one or more signals for transitioning each of the set of one or more UEs associated with the set of second identifications from an inactive mode to an active mode based at least in part on associating each of the set of one or more sidelink communication identifications with the second identification of the set of second identifications, wherein the one or more signals are transmitted using (1) a first set of resources that is different from a second set of resources used to transmit a wake-up signal for transitioning each of the set of one or more UEs from the inactive mode to the active mode for base station-UE communications, (2) a first sequence that is different from a second sequence used to transmit a wake-up signal for transitioning each of the set of one or more UEs from the inactive mode to the active mode for base station-UE communications, (3) a sequence that is indicative of a wake-up signal for transitioning each of the set of one or more UEs from the inactive mode to the active mode for both sidelink communications and base station-UE communications, or any combination thereof.

2. The apparatus of claim 1, wherein the at least one processor is configured to:
    transmit radio resource control signaling in order to configure the set of one or more UEs with resources or sequences to be used in the transmitting of the one or more signals, wherein the resources or sequences are different from wake-up resources or sequences used for base station-UE communications.

3. The apparatus of claim 1, wherein, to transmit the one or more signals, the at least one processor is configured to:
transmit the one or more signals as wake-up signals that include first payloads that indicate that the wake-up signals are for transitioning each of the set of one or more UEs from the inactive mode to the active mode for sidelink communications during a first duration of time, wherein the first payloads are different from second payloads that indicate that the wake-up signals are for transitioning each of the set of one or more UEs for base station-UE communications or for both the sidelink communications and the base station-UE communications during a second duration of time.

4. The apparatus of claim 1, wherein, to transmit the one or more signals, the at least one processor is configured to:
transmit the one or more signals as wake-up signals that include an indication of a first pool of resources for the set of one or more UEs to monitor for sidelink communications after transitioning from the inactive mode to the active mode, wherein the first pool of resources is different from a second pool of resources configured for base station-UE communications.

5. The apparatus of claim 1, wherein, to transmit the one or more signals, the at least one processor is configured to:
transmit a group wake-up signal to each of the set of one or more UEs.

6. The apparatus of claim 1, wherein the at least one processor is configured to:
determine that at least one UE of the set of one or more UEs is connected to a second base station; and
transmit, to the second base station, a message that includes a sidelink communication identification of the at least one UE to trigger the second base station to transmit a wake-up signal to the at least one UE.

7. The apparatus of claim 6, wherein the message is transmitted via an X2 interface.

8. The apparatus of claim 1, wherein, to receive the uplink message, the at least one processor is configured to:
receive either a scheduling request or a buffer status report as the uplink message.

9. The apparatus of claim 1, wherein the set of one or more sidelink communication identifications comprise layer 1 identifiers, layer 2 identifiers, or layer 3 identifiers and the set of second identifications comprises a set of Uu interface identifiers.

10. The apparatus of claim 9, wherein the set of Uu interface identifiers comprises a set of cell radio network temporary identifiers.

11. A method for wireless communication at a base station, comprising:
receiving, from a first user equipment (UE), an uplink message that includes a set of one or more sidelink communication identifications each associated with a different UE of a set of one or more UEs;
associating, based at least in part on receiving the uplink message from the first UE, each of the set of one or more sidelink communication identifications with a corresponding second identification of a set of second identifications, each of the set of second identifications also associated with each of the set of one or more UEs; and
transmitting one or more signals for transitioning each of the set of one or more UEs associated with the set of second identifications from an inactive mode to an active mode based at least in part on associating each of the set of one or more sidelink communication identifications with the second identification of the set of second identifications, wherein the one or more signals are transmitted using (1) a first set of resources that is different from a second set of resources used to transmit a wake-up signal for transitioning each of the set of one or more UEs from the inactive mode to the active mode for base station-UE communications, (2) a first sequence that is different from a second sequence used to transmit a wake-up signal for transitioning each of the set of one or more UEs from the inactive mode to the active mode for base station-UE communications, (3) a sequence that is indicative of a wake-up signal for transitioning each of the set of one or more UEs from the inactive mode to the active mode for both sidelink communications and base station-UE communications, or any combination thereof.

12. The method of claim 11, further comprising:
transmitting radio resource control signaling in order to configure the set of one or more UEs with resources or sequences to be used in the transmitting of the one or more signals, wherein the resources or sequences are different from wake-up resources or sequences used for base station-UE communications.

13. The method of claim 11, wherein transmitting the one or more signals comprises:
transmitting the one or more signals as wake-up signals that include first payloads that indicate that the wake-up signals are for transitioning each of the set of one or more UEs from the inactive mode to the active mode for sidelink communications during a first duration of time, wherein the first payloads are different from second payloads that indicate that the wake-up signals are for transitioning each of the set of one or more UEs for base station-UE communications or for both the sidelink communications and the base station-UE communications during a second duration of time.

14. The method of claim 11, wherein transmitting the one or more signals comprises:
transmitting the one or more signals as wake-up signals that include an indication of a first pool of resources for the set of one or more UEs to monitor for sidelink communications after transitioning from the inactive mode to the active mode, wherein the first pool of resources is different from a second pool of resources configured for base station-UE communications.

15. The method of claim 11, wherein transmitting the one or more signals comprises:
transmitting a group wake-up signal to each of the set of one or more UEs.

16. The method of claim 11, further comprising:
determining that at least one UE of the set of one or more UEs is connected to a second base station; and
transmitting, to the second base station, a message that includes a sidelink communication identification of the at least one UE to trigger the second base station to transmit a wake-up signal to the at least one UE.

17. The method of claim 16, wherein the message is transmitted via an X2 interface.

18. The method of claim 11, wherein receiving the uplink messages comprises:
receiving either a scheduling request or a buffer status report as the uplink message.

19. The method of claim 11, wherein the set of one or more sidelink communication identifications comprise layer 1 identifiers, layer 2 identifiers, or layer 3 identifiers and the set of second identifications comprises a set of Uu interface identifiers.

20. The method of claim 19, wherein the set of Uu interface identifiers comprises a set of cell radio network temporary identifiers.

* * * * *